(12) United States Patent
Hu et al.

(10) Patent No.: US 11,880,024 B2
(45) Date of Patent: Jan. 23, 2024

(54) OPTICAL IMAGING LENS GROUP

(71) Applicant: ZHEJIANG SUNNY OPTICS CO., LTD., Yuyao (CN)

(72) Inventors: Yabin Hu, Yuyao (CN); Fujian Dai, Yuyao (CN); Liefeng Zhao, Yuyao (CN)

(73) Assignee: ZHEJIANG SUNNY OPTICS CO., LTD., Yuyao (CN)

( * ) Notice: Subject to any disclaimer, the term of this patent is extended or adjusted under 35 U.S.C. 154(b) by 250 days.

(21) Appl. No.: 17/391,305

(22) Filed: Aug. 2, 2021

(65) Prior Publication Data
US 2022/0066183 A1 Mar. 3, 2022

(30) Foreign Application Priority Data

Aug. 31, 2020 (CN) .......................... 202010893732.3

(51) Int. Cl.
*G02B 15/14* (2006.01)
*G02B 15/20* (2006.01)
*G02B 27/00* (2006.01)

(52) U.S. Cl.
CPC ........... *G02B 15/144* (2019.08); *G02B 15/20* (2013.01); *G02B 27/0025* (2013.01)

(58) Field of Classification Search
CPC .. G02B 15/144; G02B 15/20; G02B 27/0025; G02B 15/167
See application file for complete search history.

(56) References Cited

U.S. PATENT DOCUMENTS

| | | | |
|---|---|---|---|
| 2017/0184828 A1* | 6/2017 | Machida | ........ G02B 15/143503 |
| 2019/0086638 A1* | 3/2019 | Lee | ........................ H04N 23/687 |
| 2020/0326508 A1* | 10/2020 | Kim | ........................ G03B 17/12 |
| 2021/0063702 A1* | 3/2021 | Kim | ........................... G02B 5/04 |
| 2021/0231928 A1* | 7/2021 | Sashima | ........ G02B 15/143103 |
| 2021/0294082 A1* | 9/2021 | Sato | ............... G02B 15/144511 |
| 2022/0121001 A1* | 4/2022 | Xu | ............................ G03B 5/00 |

* cited by examiner

*Primary Examiner* — Robert E. Tallman
(74) *Attorney, Agent, or Firm* — Birch, Stewart, Kolasch & Birch, LLP

(57) ABSTRACT

Disclosed herein is an optical imaging lens group, including, in order from an object side to an image side along an optical axis: a first lens group having a refractive power, in which an image side surface of a lens closest to an imaging side is concave; a second and a third lens group having a refractive power; and a fourth lens group having a negative refractive power, in which an image side surface of a lens closest to the imaging side is concave and includes at least one inflection point, wherein the first lens group is a fixed group, and the second, third and fourth lens groups move on the optical axis to realize continuous zoom from a wide-angle end to a telephoto end; and an on-axis distance TTL and an effective focal length ft of the optical imaging lens group at the telephoto end satisfy: 0.8<TTL/ft<1.5.

18 Claims, 12 Drawing Sheets

OPTICAL IMAGING LENS GROUP

CROSS-REFERENCE TO RELATED APPLICATIONS

The present application claims priority to and benefit of China patent application No. 202010893732.3, filed on Aug. 31, 2020, which is hereby incorporated by reference in its entirety.

TECHNICAL FIELD

The present disclosure relates to the technical field of optical elements, and in particular, to an optical imaging lens group.

TECHNICAL BACKGROUND

With the rapid development of smart phones today, broader requirements for the optical performance and functional diversity of imaging lenses have been put forward on the market. At present, most mobile phones adopt digital zoom to achieve this function, but digital zoom also has its big limitations, which is caused by its zoom mechanism. When a user needs to zoom, the mobile phone first takes a photo that is not zoomed. Then, a "screenshot" of an area selected by the user is taken, and after processing by the software, a target picture is obtained and stored in an album. Therefore, the quality of the photo will be reduced, and the photo will even appear unclear, blurry, etc. Therefore, in order to enable users to have better photographing experience, mobile phone lenses with continuous optical zoom function will become a new development trend.

SUMMARY

Based on this, it is necessary to provide an optical imaging lens group, which realizes the continuous zoom function through the movement of the lens groups, and the imaging quality is good during the zoom process.

The present disclosure provides an optical imaging lens group, comprising, in order from an object side to an image side along an optical axis: a first lens group having a refractive power, in which an image side surface of a lens closest to an imaging side is concave; a second lens group having a refractive power; a third lens group having a refractive power; and a fourth lens group having a negative refractive power, in which an image side surface of a lens closest to the imaging side is concave and includes at least one inflection point, wherein the first lens group is a fixed group, and the second lens group, the third lens group and the fourth lens group move on the optical axis to realize continuous zoom of the optical imaging lens group from a wide-angle end to a telephoto end; the second lens group and the third lens group have an unchanged relative position and move on the optical axis simultaneously; and an on-axis distance TTL from an object side surface of a first lens to an imaging plane of the optical imaging lens group, and an effective focal length ft of the optical imaging lens group at the telephoto end satisfy: $0.8<TTL/ft<1.5$.

In an implementation, a radius of curvature R32 of an image side surface of a first lens of the third lens group and a radius of curvature R33 of an object side surface of a second lens of the third lens group satisfy: $0.8<R32/R33<1.2$.

In an implementation, a radius of curvature R3L of an image side surface of a lens of the third lens group closest to the imaging plane and a radius of curvature R41 of an object side surface of a first lens of the fourth lens group satisfy: $0<10\times(R3L-R41)/(R3L+R41)<1$.

In an implementation, the maximum value DTmax among effective radii of lenses in the optical imaging lens group and the minimum value DTmin among the effective radii of the lenses in the optical imaging lens group satisfy: $1<DTmax/DTmin<2$.

In an implementation, a sum $\Sigma CT$ of center thicknesses of lenses in the optical imaging lens group and an on-axis distance TTL from the object side surface of the first lens to the imaging plane of the optical imaging lens group satisfy: $0.3<\Sigma CT/TTL<0.6$.

In an implementation, an on-axis distance TG3 from an object side surface of a first lens of the third lens group to an image side surface of the last lens of the third lens group and an on-axis distance TG4 from an object side surface of a first lens of the fourth lens group to an image side surface of the last lens of the fourth lens group satisfy: $0.5<TG3/TG4\leq1$.

In an implementation, a center thickness CT11 of a first lens of the first lens group and an edge thickness ET11 of the first lens of the first lens group satisfy: $0.5<CT11/ET11<1$.

In an implementation, an on-axis distance SAG42 from an intersection point of an image side surface of a first lens of the fourth lens group and the optical axis to a vertex of an effective radius of the image side surface of the first lens of the fourth lens group, and an on-axis distance SAG43 from an intersection point of an object side surface of a second lens of the fourth lens group and the optical axis to a vertex of an effective radius of the object side surface of the second lens of the fourth lens group satisfy: $0.8<SAG42/SAG43<1.3$.

In an implementation, an effective focal length fG1 of the first lens group and an effective focal length fG3 of the third lens group satisfy: $-1.2<fG1/fG3<-0.7$.

In an implementation, an effective focal length fG4 of the fourth lens group and an effective focal length fw of the optical imaging lens group at the wide-angle end satisfy: $-1.5<fG4/fw<-0.9$.

In an implementation, a radius of curvature R1L of an image side surface of the last lens in the first lens group and a radius of curvature R21 of an object side surface of a first lens of the second lens group satisfy: $1<R1L/R21<1.5$.

In an implementation, a displacement amount $\Delta TG12$ of an on-axis distance between the first lens group and the second lens group when the optical imaging lens group changes from the wide-angle end to the telephoto end, and a change amount $\Delta f$ of an effective focal length of the optical imaging lens group when changing from the wide-angle end to the telephoto end satisfy: $-0.6<\Delta TG12/\Delta f<-0.3$.

In an implementation, a displacement amount $\Delta TG34$ of an on-axis distance between the third lens group and the fourth lens group when the optical imaging lens group changes from the wide-angle end to the telephoto end, and a change amount $\Delta f$ of an effective focal length of the optical imaging lens group when changing from the wide-angle end to the telephoto end satisfy: $-0.4<\Delta TG34/\Delta f<-0.1$.

Another aspect of the present disclosure provides an optical imaging lens group, comprising, in order from an object side to an image side along an optical axis: a first lens group having a refractive power, in which an image side surface of a lens closest to an imaging side is concave; a second lens group having a refractive power; a third lens group having a refractive power; and a fourth lens group having a negative refractive power, in which an image side surface of a lens closest to the imaging side is concave and includes at least one inflection point, wherein the first lens group is a fixed group, and the second lens group, the third lens group and the fourth lens group move on the optical axis to realize continuous zoom of the optical imaging lens group from a wide-angle end to a telephoto end; and the second lens group and the third lens group have an unchanged relative position and move on the optical axis simultaneously.

In an implementation, an effective focal length fG1 of the first lens group and an effective focal length fG3 of the third lens group satisfy: $-1.2<\text{fG1/fG3}<-0.7$.

In an implementation, an on-axis distance TTL from an object side surface of a first lens to an imaging plane of the optical imaging lens group, and an effective focal length ft of the optical imaging lens group at the telephoto end satisfy: $0.8<\text{TTL/ft}<1.5$.

In an implementation, a radius of curvature R32 of an image side surface of a first lens of the third lens group and a radius of curvature R33 of an object side surface of a second lens of the third lens group satisfy: $0.8<\text{R32/R33}<1.2$.

In an implementation, a radius of curvature R3L of an image side surface of a lens of the third lens group closest to the imaging plane and a radius of curvature R41 of an object side surface of a first lens of the fourth lens group satisfy: $0<10\times(\text{R3L}-\text{R41})/(\text{R3L}+\text{R41})<1$.

In an implementation, the maximum value DTmax among effective radii of lenses in the optical imaging lens group and the minimum value DTmin among the effective radii of the lenses in the optical imaging lens group satisfy: $1<\text{DTmax/DTmin}<2$.

In an implementation, a sum $\Sigma\text{CT}$ of center thicknesses of lenses in the optical imaging lens group and an on-axis distance TTL from the object side surface of the first lens to the imaging plane of the optical imaging lens group satisfy: $0.3<\Sigma\text{CT/TTL}<0.6$.

In an implementation, an on-axis distance TG3 from an object side surface of a first lens of the third lens group to an image side surface of the last lens of the third lens group and an on-axis distance TG4 from an object side surface of a first lens of the fourth lens group to an image side surface of the last lens of the fourth lens group satisfy: $0.5<\text{TG3/TG4}\leq 1$.

In an implementation, a center thickness CT11 of a first lens of the first lens group and an edge thickness ET11 of the first lens of the first lens group satisfy: $0.5<\text{CT11/ET11}<1$.

In an implementation, an on-axis distance SAG42 from an intersection point of an image side surface of a first lens of the fourth lens group and the optical axis to a vertex of an effective radius of the image side surface of the first lens of the fourth lens group, and an on-axis distance SAG43 from an intersection point of an object side surface of a second lens of the fourth lens group and the optical axis to a vertex of an effective radius of the object side surface of the second lens of the fourth lens group satisfy: $0.8<\text{SAG42/SAG43}<1.3$.

In an implementation, an effective focal length fG4 of the fourth lens group and an effective focal length fw of the optical imaging lens group at the wide-angle end satisfy: $-1.5<\text{fG4/fw}<-0.9$.

In an implementation, a radius of curvature R1L of an image side surface of the last lens in the first lens group and a radius of curvature R21 of an object side surface of a first lens of the second lens group satisfy: $1<\text{R1L/R21}<1.5$.

In an implementation, a displacement amount $\Delta\text{TG12}$ of an on-axis distance between the first lens group and the second lens group when the optical imaging lens group changes from the wide-angle end to the telephoto end, and a change amount $\Delta f$ of an effective focal length of the optical imaging lens group when changing from the wide-angle end to the telephoto end satisfy: $-0.6<\Delta\text{TG12}/\Delta f<-0.3$.

In an implementation, a displacement amount $\Delta\text{TG34}$ of an on-axis distance between the third lens group and the fourth lens group when the optical imaging lens group changes from the wide-angle end to the telephoto end, and a change amount $\Delta f$ of an effective focal length of the optical imaging lens group when changing from the wide-angle end to the telephoto end satisfy: $-0.4<\Delta\text{TG34}/\Delta f<-0.1$.

Another aspect of the present disclosure provides an optical imaging lens group, wherein a radius of curvature R32 of an image side surface of a first lens of the third lens group and a radius of curvature R33 of an object side surface of a second lens of the third lens group satisfy: $0.8<\text{R32/R33}<1.2$; and a radius of curvature R3L of an image side surface of a lens of the third lens group closest to the imaging plane and a radius of curvature R41 of an object side surface of a first lens of the fourth lens group satisfy: $0<10\times(\text{R3L}-\text{R41})/(\text{R3L}+\text{R41})<1$.

The present disclosure proposes an optical imaging lens group consisting of seven aspherical lens, wherein the continuous zoom function is realized through the movement of the lens groups, and the imaging quality is good during the zoom process.

BRIEF DESCRIPTION OF THE DRAWINGS

In order to more clearly illustrate the technical solutions in embodiments of the present disclosure or the prior art, the drawings needed to be used in the description of the embodiments or the prior art will be briefly described below. Obviously, the drawings in the following description are only some embodiments of the present disclosure, and other drawings can also be obtained by those of ordinary skill in the art from the structures illustrated in these drawings without any creative efforts.

Figure 1:
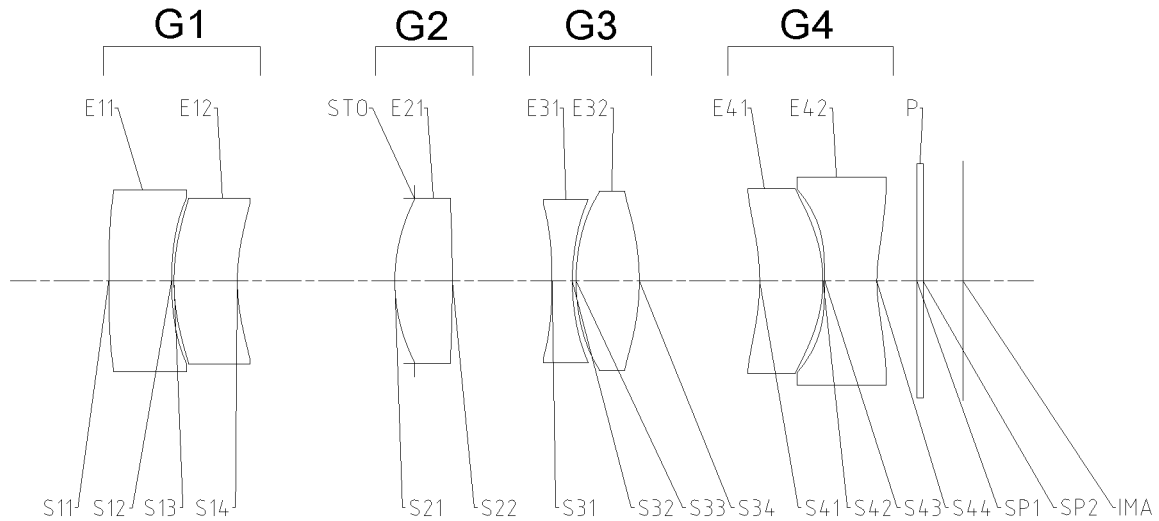
FIG. 1 shows a schematic structural diagram of an optical imaging lens group according to Embodiment 1 of the present application when it is in a wide-angle state.

The implementation of the objective, functional features and advantages of the present disclosure will be further described with reference to the drawing.

DETAILED DESCRIPTION OF THE EMBODIMENTS

In order to better understand the present application, various aspects of the present application will be described in more detail with reference to the drawings. It should be understood that the detailed description is merely description of exemplary implementations of the present application, and does not limit the scope of the present application in any way. Throughout the description, the same reference numerals refer to the same elements. The expression "and/or" includes any and all combinations of one or more of the associated listed items.

It should be noted that in the present description, the expressions of "first", "second", "third" etc. are only used to distinguish one feature from another feature, and do not indicate any limitation on the feature. Therefore, without departing from the teachings of the present application, a first lens discussed below may also be referred to as a second lens or a third lens.

In the drawings, for convenience of explanation, the thickness, size, and shape of the lens have been slightly exaggerated. Specifically, the shapes of spherical or Aspherical surfaces shown in the drawings are shown by way of example. That is, the shapes of the spherical or Aspherical surfaces are not limited to those shown in the drawings. The drawings are only examples and are not drawn strictly to scale.

Herein, a paraxial region refers to a region near an optical axis. If a lens surface is convex and the position of the convex surface is not defined, then it means that the lens surface is convex at least in the paraxial region; and if the lens surface is concave and the position of the concave surface is not defined, then it means that the lens surface is concave at least in the paraxial region. A surface of each lens closest to an object to be captured is referred as an object side surface of the lens, and a surface of each lens closest to an imaging plane is referred as an image side surface of the lens.

It should also be understood that the terms "comprising", "comprise", "having", "including" and/or "include" when used in the present description, indicate the existence of stated features, elements and/or components, but do not exclude the presence or addition of one or more other features, elements, components and/or combinations thereof. Furthermore, when an expression such as "at least one of" appears after a list of listed features, it modifies the entire list of features, rather than individual elements in the list. In addition, when an implementation of the present application is described, "may" is used to indicate "one or more implementations of the present application". Also, the term "exemplary" is intended to refer to an example or illustration.

Unless otherwise defined, all terms (including technical and scientific terms) used herein have the same meanings as commonly understood by those of ordinary skill in the art to which the present application belongs. It should also be understood that the terms (such as those defined in commonly used dictionaries) should be interpreted to have meanings consistent with their meaning in the context of the relevant art and will not be interpreted in an idealized or overly formal sense unless it is clearly defined herein.

It needs to be noted that, in the case of no conflict, the embodiments in the present application and the features in the embodiments can be combined with each other. The present application will be described in detail below in conjunction with embodiments with reference to the drawings.

The features, principles and other aspects of the present application will be described in detail below.

An optical imaging lens group according to an exemplary implementation of the present application may include, for example, lens groups composed of seven lenses having refractive powers, i.e., a first lens group, a second lens group, a third lens group and a fourth lens group. The four lens groups are arranged in order from an object side to an image side along an optical axis.

In an exemplary implementation, the first lens group may have a positive refractive power or a negative refractive power, in which an image side surface of a lens closest to an imaging side is concave; the second lens group may have a positive refractive power or a negative refractive power; the third lens group may have a positive refractive power or a negative refractive power; the fourth lens group has a negative refractive power, in which an image side surface of a lens closest to the imaging side is concave and includes at least one inflection point; wherein the first lens group is a fixed group, and the second lens group, the third lens group and the fourth lens group move on the optical axis to realize continuous zoom of the optical imaging lens group from a wide-angle end to a telephoto end; and the second lens group and the third lens group have an unchanged relative position and move on the optical axis simultaneously.

In an exemplary implementation, the optical imaging lens group of the present application may satisfy a conditional expression $0.8<TTL/ft<1.5$, where TTL is an on-axis distance from an object side surface of a first lens to an imaging plane of the optical imaging lens group, and ft is an effective focal length of the optical imaging lens group at the telephoto end. By controlling the total optical length of the imaging system in a reasonable range, the continuous zoom function from the wide-angle end to the telephoto end is achieved, and the ratio of TTI and ft is constrained to control the volume of the overall module on the one hand, and on the other hand achieve the effect of 5× optical zoom (under the equivalent focal length) at the telephoto end. More specifically, TTL and ft may satisfy: $1.24 \leq TTL/ft \leq 1.25$.

In an exemplary implementation, the optical imaging lens group of the present application may satisfy a conditional expression $0.8<R32/R33<1.2$, where R32 is a radius of curvature of an image side surface of a first lens of the third lens group, and R33 is a radius of curvature of an object side surface of a second lens of the third lens group. By constraining the ratio of the radii of curvature of the two lenses to be around 1.0, they are close to a double cemented form, facilitating the reduction of the chromatic difference of magnification of the system. More specifically, R32 and R33 may satisfy: $0.99 \leq R32/R33 \leq 1.01$.

In an exemplary implementation, the optical imaging lens group of the present application may satisfy a conditional expression $0<10\times(R3L-R41)/(R3L+R41)<1$, where R3L is a radius of curvature of an image side surface of a lens of the third lens group closest to the imaging plane, and R41 is a radius of curvature of an object side surface of a first lens of the fourth lens group. More specifically, R3L and R41 may satisfy: $0.48 \leq 10\times(R3L-R41)/(R3L+R41) \leq 0.61$.

In an exemplary implementation, the optical imaging lens group of the present application may satisfy a conditional expression $1<DTmax/DTmin<2$, where DTmax is the maximum value among effective radii of lenses in the optical imaging lens group, and DTmin is the minimum value among the effective radii of the lenses in the optical imaging lens group. Considering that the zoom system adopts the lens trimming form in practice, by controlling the ratio of the maximum value and the minimum value among the effective radii of the lenses, the influence of trimming on the relative illumination of the system and other factors is minimized as much as possible. More specifically, DTmax and DTmin may satisfy: $1.35 \leq DTmax/DTmin \leq 1.70$.

In an exemplary implementation, the optical imaging lens group of the present application may satisfy a conditional expression $0.3<\Sigma CT/TTL<0.6$, where $\Sigma CT$ is a sum of center thicknesses of lenses in the optical imaging lens group, and TTL is an on-axis distance from an object side surface of a first lens to the imaging plane of the optical imaging lens group. More specifically, $\Sigma CT$ and TTL may satisfy: $0.44 \leq \Sigma CT/TTL<0.45$.

In an exemplary implementation, the optical imaging lens group of the present application may satisfy a conditional expression $0.5<TG3/TG4 \leq 1$, where TG3 is an on-axis distance from an object side surface of a first lens of the third lens group to an image side surface of the last lens of the third lens group, and TG4 is an on-axis distance from an object side surface of a first lens of the fourth lens group to an image side surface of the last lens of the fourth lens group. More specifically, TG3 and TG4 may satisfy: $0.75 \leq TG3/TG4 \leq 0.94$.

In an exemplary implementation, the optical imaging lens group of the present application may satisfy a conditional expression $0.5<CT11/ET11<1$, where CT11 is a center thickness of a first lens of the first lens group, and ET11 is an edge thickness of a first lens of the first lens group. More specifically, CT11 and ET11 may satisfy: $0.77 \leq CT11/ET11 \leq 0.86$.

In an exemplary implementation, the optical imaging lens group of the present application may satisfy a conditional expression $0.8<SAG42/SAG43<1.3$, where SAG42 is an on-axis distance from an intersection point of an image side surface of a first lens of the fourth lens group and the optical axis to a vertex of an effective radius of the image side surface of the first lens of the fourth lens group, and SAG43 is an on-axis distance from an intersection point of an object side surface of a second lens of the fourth lens group and the optical axis to a vertex of an effective radius of the object side surface of the second lens of the fourth lens group. More specifically, SAG42 and SAG43 may satisfy: $0.97 \leq SAG42/SAG43 \leq 1.18$.

In an exemplary implementation, the optical imaging lens group of the present application may satisfy a conditional expression $-1.2<fG1/fG3<-0.7$, where fG1 is an effective focal length of the first lens group, and fG3 is an effective focal length of the third lens group. More specifically, fG1 and fG3 may satisfy: $-1.07 \leq fG1/fG3 \leq -0.80$.

In an exemplary implementation, the optical imaging lens group of the present application may satisfy a conditional expression $-1.5<fG4/fw<-0.9$, where fG4 is an effective focal length of the fourth lens group, and fw is an effective focal length of the optical imaging lens group at the wide-angle end. More specifically, fG4 and fw may satisfy: $-1.06 \leq fG4/fw$.

In an exemplary implementation, the optical imaging lens group of the present application may satisfy a conditional expression $1<R1L/R21<1.5$, where R1L is a radius of curvature of an image side surface of the last lens in the first lens group, and R21 is a radius of curvature of an object side surface of a first lens in the second lens group. More specifically, R1L and R21 may satisfy: $1.08 \leq R1L/R21 \leq 1.22$.

In an exemplary implementation, the optical imaging lens group of the present application may satisfy a conditional expression $-0.6<\Delta TG12/\Delta f<-0.3$, where $\Delta TG12$ is a displacement amount of an on-axis distance between the first lens group and the second lens group when the optical imaging lens group changes from the wide-angle end to the telephoto end, and $\Delta f$ is a change amount of an effective focal length of the optical imaging lens group when changing from the wide-angle end to the telephoto end. More specifically, $\Delta TG12$ and $\Delta f$ may satisfy: $-0.48 \leq \Delta TG12/\Delta f \leq -0.46$.

In an exemplary implementation, the optical imaging lens group of the present application may satisfy a conditional expression $-0.4<\Delta TG34/\Delta f<-0.1$, where $\Delta TG34$ is a displacement amount of an on-axis distance between the third lens group and the fourth lens group when the optical imaging lens group changes from the wide-angle end to the telephoto end, and $\Delta f$ is a change amount of an effective focal length of the optical imaging lens group when changing from the wide-angle end to the telephoto end. More specifically, $\Delta TG34$ and $\Delta f$ may satisfy: $-0.22 \leq \Delta TG34/\Delta f \leq -0.17$.

In an exemplary implementation, the above-mentioned optical imaging lens group may further include at least one diaphragm. The diaphragm can be set at an appropriate position as needed, for example, between the second lens of the first lens group and the first lens of the second lens group. Optionally, the above-mentioned optical imaging lens group may further include a filter for correcting color deviation and/or protective glass for protecting a photosensitive element located on the imaging plane.

All the technical features in the optical imaging lens group of the present disclosure described above can be combined and configured to achieve corresponding functions and effects.

The optical imaging lens group according to the above-mentioned implementations of the present application may adopt multiple groups of lens, for example, four groups described above. By reasonably distributing the refractive power, surface shape, center thickness of each lens, on-axis distances between lenses, etc., the total optical length of the imaging system is controlled within a reasonable range to achieve the continuous zoom function from the wide-angle end to the telephoto end, and the image quality is good during the zoom process.

However, it should be understood by those skilled in the art that the number of lenses constituting the optical imaging lens group can be changed without departing from the technical solutions claimed in the present application, to obtain respective results and advantages described in the description. For example, although seven lenses have been described in the implementations as an example, the optical imaging lens group is not limited to including the seven lenses. If necessary, the optical imaging lens group may also include other numbers of lenses.

Specific embodiments of the optical imaging lens group will be further described below with reference to the drawings.

Embodiment 1

Figure 2:
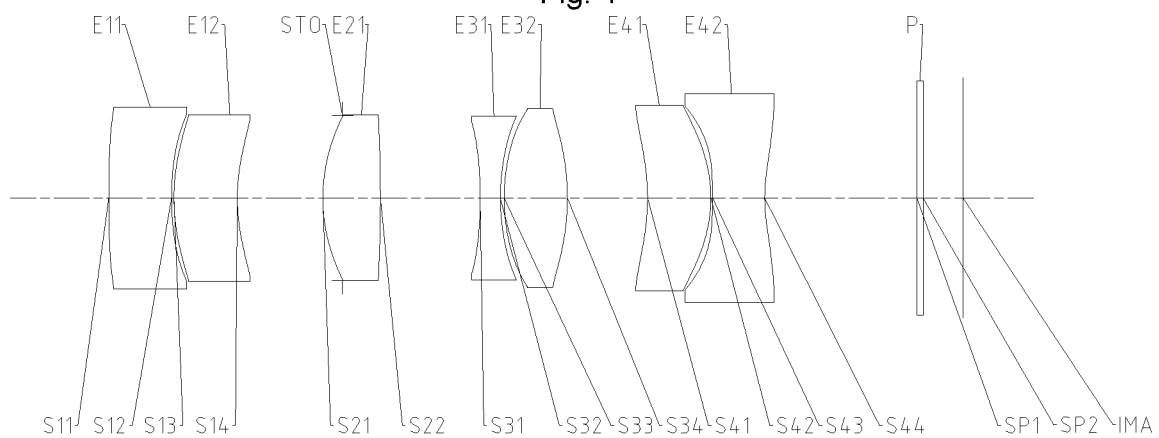
FIG. 2 shows a schematic structural diagram of the optical imaging lens group according to Embodiment 1 of the present application when it is in an intermediate state in a process of switching from the wide-angle state to a telephoto state.

A schematic structural diagram of an optical imaging lens group according to Embodiment 1 of the present application will be described below with reference to FIGS. 1 to 6D, wherein FIG. 1 shows a schematic structural diagram of the optical imaging lens group according to Embodiment 1 of the present application when it is in the wide-angle state; FIG. 2 shows a schematic structural diagram of the optical imaging lens group according to Embodiment 1 of the present application when it is in the intermediate state in the process of switching from the wide-angle state to the telephoto state; and FIG. 3 shows a schematic structural diagram of the optical imaging lens group according to Embodiment 1 of the present application when it is in the telephoto state.

Figure 3:
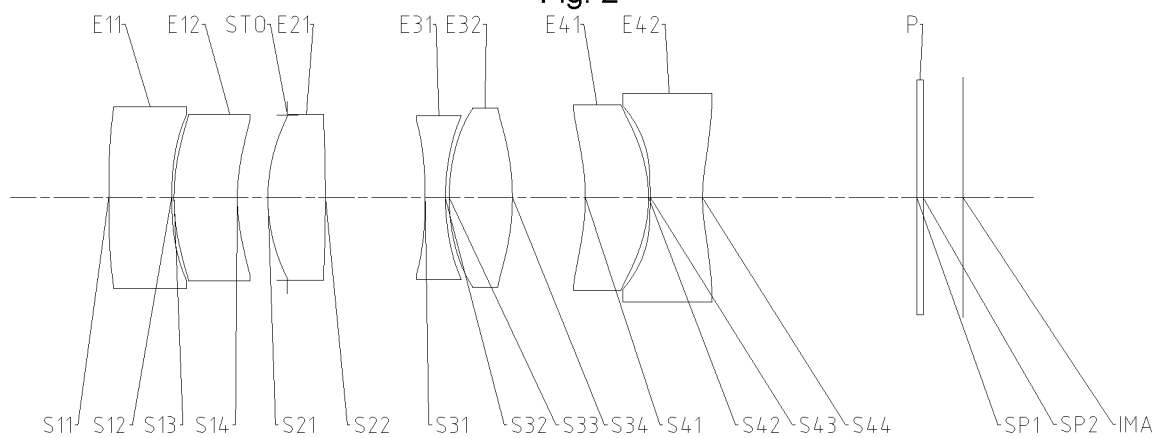
FIG. 3 shows a schematic structural diagram of the optical imaging lens group according to Embodiment 1 of the present application when it is in the telephoto state.

As shown in FIGS. 1 to 3, the optical imaging lens group includes a first lens group G1, a diaphragm STO, a second lens group G2, a third lens group G3, a fourth lens group G4, a filter P and an imaging plane IMA in order from an object side to an image side.

Among them, the first lens group G1 includes a first lens E11 and a second lens E12, the first lens E11 has a negative refractive power, a convex object side surface S11 and a concave image side surface S12, and the second lens E12 has a negative refractive power, a convex object side surface S13 and a concave image side surface S14; the second lens group G2 includes a first lens E21, and the first lens E21 has a positive refractive power, a convex object side surface S21 and a convex image side surface S22; the third lens group G3 includes a first lens E31 and a second lens E32, the first lens E31 has a negative refractive power, a concave object side surface S31 and a concave image side surface S32, and the second lens E32 has a positive refractive power, a convex object side surface S33 and a convex image side surface S34; the fourth lens group G4 includes a first lens E41 and a second lens E42, the first lens E41 has a positive refractive power, a concave object side surface S41 and a convex image side surface S42, and the second lens E42 has a negative refractive power, a concave object side surface S43 and a concave image side surface S44. Light from an object sequentially passes through the respective surfaces S11 to SP2 and finally forms an image on the imaging plane IMA.

Basic parameters of the optical imaging lens group of Embodiment 1 are as shown in Table 1, wherein the radius of curvature, thickness, and focal length are all in unit of millimetres.

TABLE 1

| Surface No. | Surface type | Radius of curvature | Thickness | Focal length | Refractive index | Abbe number | Conic coefficient |
|---|---|---|---|---|---|---|---|
| OBJ | Spherical | Infinity | Infinity | | | | |
| S11 | Aspherical | 77.0211 | 2.1337 | −26.95 | 1.55 | 56.1 | 90.6600 |
| S12 | Aspherical | 12.2384 | 0.0800 | | | | 8.7626 |
| S13 | Aspherical | 7.3054 | 2.1500 | −9002.52 | 1.68 | 19.2 | −2.6459 |
| S14 | Aspherical | 6.4286 | T1 | | | | −6.8106 |
| ST0 | Spherical | Infinity | −0.6652 | | | | |
| S21 | Aspherical | 5.9340 | 1.9577 | 10.01 | 1.55 | 56.1 | −1.1674 |
| S22 | Aspherical | −61.6991 | 3.3848 | | | | −15.6786 |
| S31 | Aspherical | −21.0801 | 0.6855 | −8.01 | 1.67 | 20.4 | 28.6426 |
| S32 | Aspherical | 7.2515 | 0.1306 | | | | 3.1527 |
| S33 | Aspherical | 7.1569 | 2.1500 | 7.01 | 1.57 | 37.3 | 1.6417 |
| S34 | Aspherical | −8.0979 | T2 | | | | 4.8587 |
| S41 | Aspherical | −7.2261 | 2.1500 | 15.95 | 1.68 | 19.2 | −11.2759 |
| S42 | Aspherical | −4.8548 | 0.0600 | | | | −1.2714 |
| S43 | Aspherical | −23.0075 | 1.7653 | −8.13 | 1.54 | 55.7 | 38.8935 |
| S44 | Aspherical | 5.5322 | T3 | | | | −11.1038 |
| SP1 | Spherical | Infinity | 0.2100 | | 1.52 | 64.2 | |
| SP2 | Spherical | Infinity | 1.3558 | | | | |
| IMA | Spherical | Infinity | | | | | |

Corresponding values of T1, T2 and T3 in the wide-angle state (W), intermediate state (M) and telephoto state (T) of the optical imaging lens group of Embodiment 1 during the zoom process are given in Table 2 below in unit of millimetres.

TABLE 2

|    | W      | M      | T      |
|----|--------|--------|--------|
| T1 | 6.0146 | 3.5713 | 1.7033 |
| T2 | 4.0863 | 2.7214 | 2.4735 |
| T3 | 1.3608 | 5.1681 | 7.2850 |

In Embodiment 1, a value of a total effective focal length f of the optical imaging lens group is 3.69 mm, a value of an on-axis distance TTL from the object side surface S11 of the first lens E11 to the imaging plane IMA is 29.01 mm, and a value of ImgH that is half of a diagonal length of an effective pixel region on the imaging plane IMA is 4.08 mm.

In Embodiment 1, an on-axis distance TTL from the object side surface of the first lens to the imaging plane of the optical imaging lens group, and an effective focal length ft of the optical imaging lens group at the telephoto end have a relationship expression of TTL/ft=1.24, which satisfies: 0.8<TTL/ft<1.5.

In Embodiment 1, a radius of curvature R32 of an image side surface of a first lens of the third lens group and a radius of curvature R33 of an object side surface of a second lens of the third lens group have a relationship expression of R32/R33=1.01, which satisfies 0.8<R32/R33<1.2.

In Embodiment 1, a radius of curvature R3L of an image side surface of a lens of the third lens group closest to the imaging plane and a radius of curvature R41 of an object side surface of a first lens of the fourth lens group have a relationship expression of 10×(R3L−R41)/(R3L+R41)=0.57, which satisfies 0<10×(R3L−R41)/(R3L+R41)<1.

In Embodiment 1, the maximum value DTmax among effective radii of lenses in the optical imaging lens group and the minimum value DTmin among the effective radii of the lenses in the optical imaging lens group have a relationship expression of DTmax/DTmin=1.36, which satisfies 1<DTmax/DTmin<2.

In Embodiment 1, a sum ΣCT of center thicknesses of lenses in the optical imaging lens group and an on-axis distance TTL from the object side surface of the first lens to the imaging plane of the optical imaging lens group have a relationship expression of ΣCT/TTL=0.45, which satisfies 0.3<ΣCT/TTL<0.6.

In Embodiment 1, an on-axis distance TG3 from an object side surface of the first lens of the third lens group to an image side surface of the last lens of the third lens group and an on-axis distance TG4 from an object side surface of a first lens of the fourth lens group to an image side surface of the last lens of the fourth lens group have a relationship expression of TG3/TG4=0.75, which satisfies 0.5<TG3/TG4≤1.

In Embodiment 1, a center thickness CT11 of the first lens of the first lens group and an edge thickness ET11 of the first lens of the first lens group have a relationship expression of CT11/ET11=0.86, which satisfies 0.5<CT11/ET11<1.

In Embodiment 1, an on-axis distance SAG42 from an intersection point of an image side surface of a first lens of the fourth lens group and the optical axis to a vertex of an effective radius of the image side surface of the first lens of the fourth lens group, and an on-axis distance SAG43 from an intersection point of an object side surface of a second lens of the fourth lens group and the optical axis to a vertex of an effective radius of the object side surface of the second lens of the fourth lens group have a relationship expression of SAG42/SAG43=1.01, which satisfies 0.8<SAG42/SAG43<1.3.

In Embodiment 1, an effective focal length fG1 of the first lens group and an effective focal length fG3 of the third lens group have a relationship expression of fG1/fG3=−0.80, which satisfies −1.2<fG1/fG3<−0.7.

In Embodiment 1, an effective focal length fG4 of the fourth lens group and an effective focal length fw of the optical imaging lens group at the wide-angle end have a relationship expression of fG4/fw=−1.06, which satisfies −1.5<fG4/fw<−0.9.

In Embodiment 1, a radius of curvature R1L of an image side surface of the last lens in the first lens group and a radius of curvature R21 of an object side surface of the first lens of the second lens group have a relationship expression of R1L/R21=1.08, which satisfies 1<R1L/R21<1.5.

In Embodiment 1, a displacement amount ΔTG12 of an on-axis distance between the first lens group and the second lens group when the optical imaging lens group changes from the wide-angle end to the telephoto end, and a change amount Δf of an effective focal length of the optical imaging lens group when changing from the wide-angle end to the telephoto end have a relationship expression of ΔTG12/Δf=−0.46, which satisfies −0.6<ΔTG12/Δf<−0.3.

In Embodiment 1, a displacement amount ΔTG34 of an on-axis distance between the third lens group and the fourth lens group when the optical imaging lens group changes from the wide-angle end to the telephoto end, and a change amount Δf of an effective focal length of the optical imaging lens group when changing from the wide-angle end to the telephoto end have a relationship expression of ΔTG34/Δf=−0.17, which satisfies −0.4<ΔTG34/Δf<−0.1.

Higher-order coefficients A4, A6, A8, A10, A12, A14, A16, A18 and A20 of aspherical lens surfaces S11 to S44 of aspherical lenses that can be used in Embodiment 1 of the present application are given in Table 3 below.

TABLE 3

| Surface No. | A4 | A6 | A8 | A10 | A12 | A14 | A16 | A18 | A20 |
|---|---|---|---|---|---|---|---|---|---|
| S11 | 1.7320E−03 | −7.0214E−05 | −1.1470E−05 | 5.1188E−06 | −1.0340E−06 | 1.2738E−07 | −9.6505E−09 | 4.1306E−10 | −7.6558E−12 |
| S12 | 5.7306E−03 | −1.4445E−03 | 2.9460E−04 | −4.0645E−05 | 3.2852E−06 | −8.5940E−08 | −7.7646E−09 | 5.6549E−10 | −7.4643E−12 |
| S13 | 2.2606E−03 | −1.0987E−03 | 2.5281E−04 | −3.9135E−05 | 4.0114E−06 | −2.4004E−07 | 6.1069E−09 | 0.0000E+00 | 0.0000E+00 |
| S14 | 8.2802E−05 | −1.3538E−04 | 1.2586E−05 | −8.2531E−07 | 5.2087E−08 | −5.8732E−09 | 3.2657E−10 | 0.0000E+00 | 0.0000E+00 |
| S21 | 4.5573E−04 | 1.7058E−05 | −7.2266E−06 | 1.7195E−06 | −2.4472E−07 | 1.8367E−08 | −6.2840E−10 | 0.0000E+00 | 0.0000E+00 |
| S22 | −4.8585E−05 | 8.2477E−06 | −7.1332E−06 | 1.7059E−06 | −2.4107E−07 | 1.7357E−08 | −6.0940E−10 | 0.0000E+00 | 0.0000E+00 |
| S31 | −4.7413E−03 | 4.8916E−04 | −2.9640E−05 | 1.0947E−05 | −2.7181E−06 | 2.6660E−07 | −1.0440E−08 | 0.0000E+00 | 0.0000E+00 |
| S32 | −2.6277E−03 | −5.4755E−04 | 2.3114E−04 | −2.1523E−05 | −3.6360E−07 | 1.2387E−07 | −4.9954E−09 | 0.0000E+00 | 0.0000E+00 |
| S33 | 2.2116E−03 | −1.1841E−03 | 2.8817E−04 | −2.9970E−05 | 9.2912E−07 | 5.5676E−08 | −3.4509E−09 | 0.0000E+00 | 0.0000E+00 |
| S34 | 1.7460E−03 | 2.3713E−05 | 1.6335E−05 | −2.8835E−06 | 4.9531E−07 | −3.6875E−08 | 2.1725E−09 | 0.0000E+00 | 0.0000E+00 |
| S41 | 6.9226E−04 | −2.0042E−04 | 4.7269E−05 | −2.1829E−06 | −4.2673E−07 | 6.2684E−08 | −2.2860E−09 | 0.0000E+00 | 0.0000E+00 |

TABLE 3-continued

| Surface No. | A4 | A6 | A8 | A10 | A12 | A14 | A16 | A18 | A20 |
|---|---|---|---|---|---|---|---|---|---|
| S42 | 8.9382E−04 | −6.3466E−04 | 1.4789E−04 | −1.1275E−05 | −1.6859E−07 | 5.2297E−08 | −1.1045E−09 | 0.0000E+00 | 0.0000E+00 |
| S43 | −1.2194E−02 | 3.1274E−04 | 6.3982E−05 | 9.0957E−06 | −3.8133E−06 | 3.5525E−07 | −1.0570E−08 | 0.0000E+00 | 0.0000E+00 |
| S44 | −5.7033E−03 | 4.9569E−04 | −2.5306E−05 | 1.0755E−06 | −1.0597E−07 | 8.1129E−09 | −2.2723E−10 | 0.0000E+00 | 0.0000E+00 |

Figure 4A:
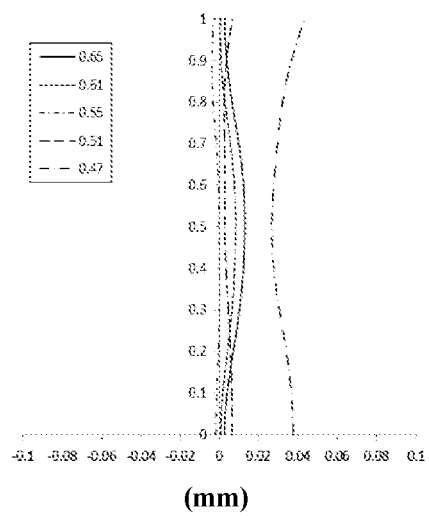
FIGS. 4A to 4D show a longitudinal aberration curve, astigmatism curve, distortion curve and lateral color curve of the optical imaging lens group of Embodiment 1 when it is in the wide-angle state, respectively.
Figure 4B:
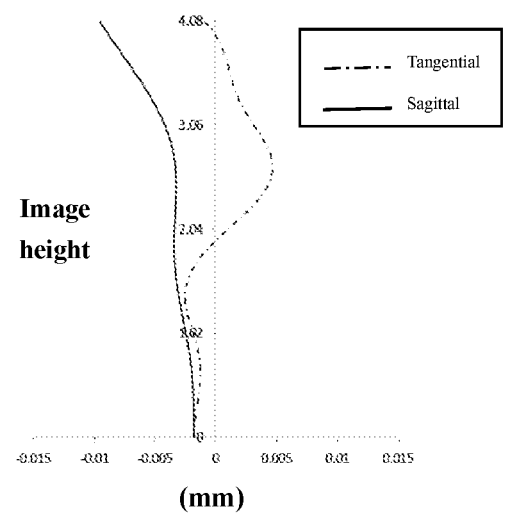
Figure 4C:
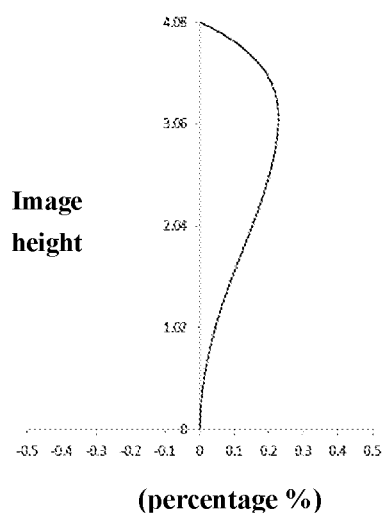
Figure 4D:
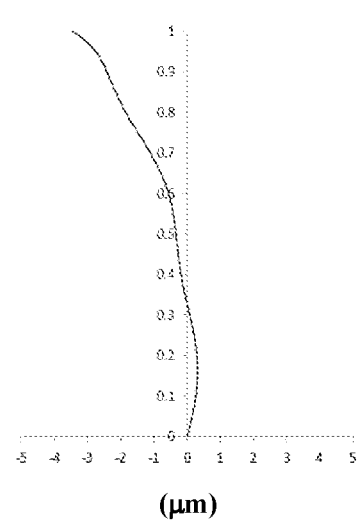
Figure 5A:
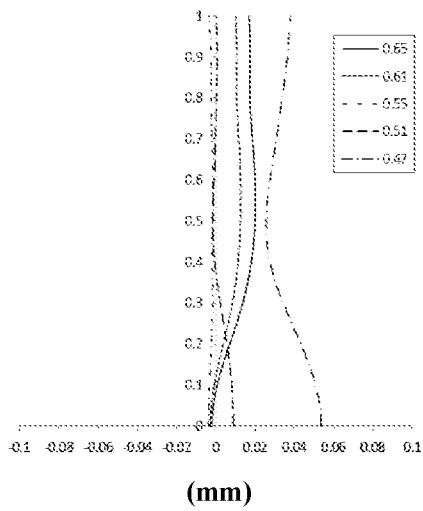
FIGS. 5A to 5D show a longitudinal aberration curve, astigmatism curve, distortion curve and lateral color curve of the optical imaging lens group of Embodiment 1 when it is in the intermediate state in the process of switching from the wide-angle state to the telephoto state, respectively.
Figure 5B:
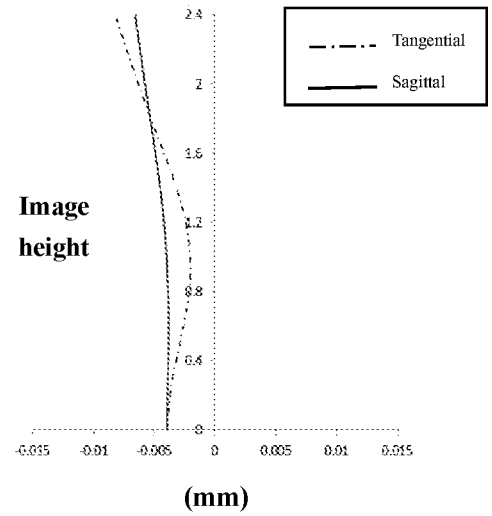
Figure 5C:
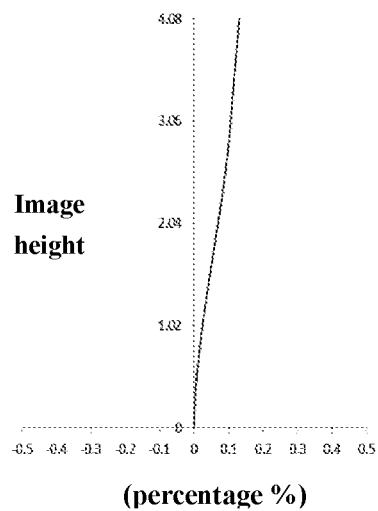
Figure 5D:
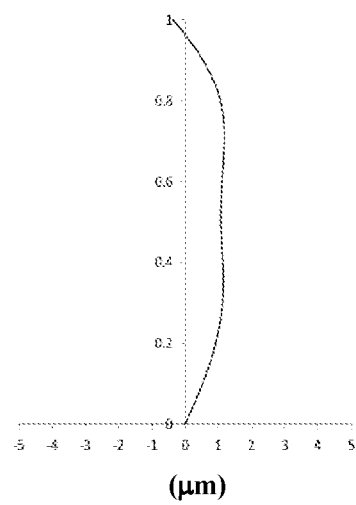
Figure 6A:
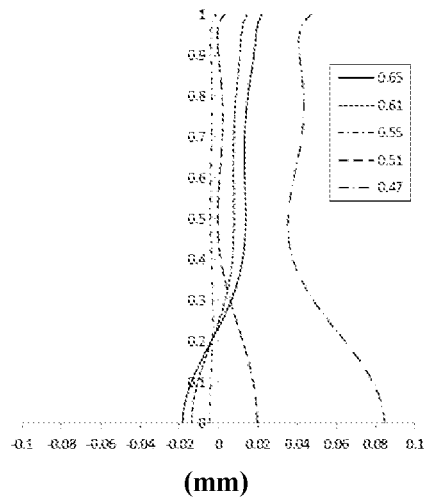
FIGS. 6A to 6D show a longitudinal aberration curve, astigmatism curve, distortion curve and lateral color curve of the optical imaging lens group of Embodiment 1 when it is in the telephoto state, respectively.
Figure 6B:
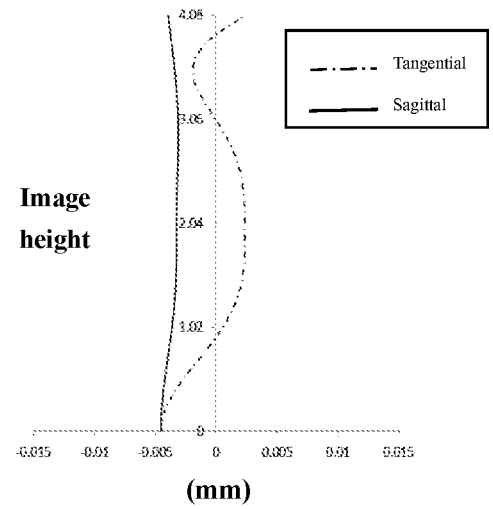
Figure 6C:
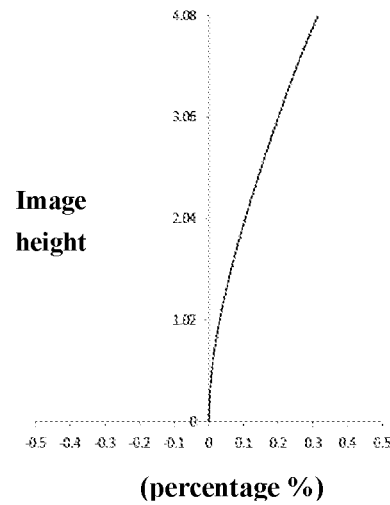
Figure 6D:
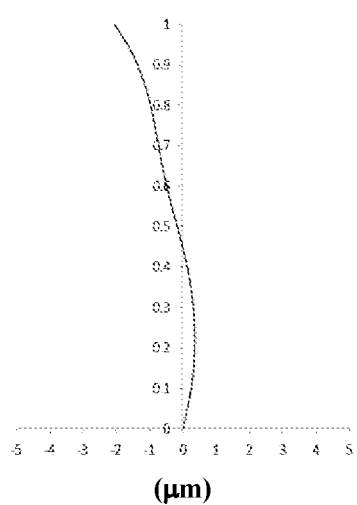

FIGS. 4A, 5A and 6A show longitudinal aberration curves of the optical imaging lens group of Embodiment 1 when it is in the wide-angle state, the intermediate state, and the telephoto state, respectively, which represent the deviation of the converged focal point after light of different wavelengths passes through the camera lens. FIGS. 4B, 5B and 6B show astigmatism curves of the optical imaging lens group of Embodiment 1 when it is in the wide-angle state, the intermediate state, and the telephoto state, respectively, which represent the curvature of the tangential image plane and the curvature of the sagittal image plane. FIGS. 4C, 5C and 6C show distortion curves of the optical imaging lens group of Embodiment 1 when it is in the wide-angle state, the intermediate state and the telephoto state, respectively, which represent distortion magnitude values corresponding to different image heights. FIGS. 4D, 5D and 6D show lateral color curves of the optical imaging lens group of Embodiment 1 when it is in the wide-angle state, the intermediate state, and the telephoto state, respectively, which represent the deviation of different image heights on the imaging plane after light passes through the camera lens. According to FIGS. 4A to 6D, it can be seen that the optical imaging lens group given in Embodiment 1 can achieve good imaging quality in all states.

Embodiment 2

Figure 7:
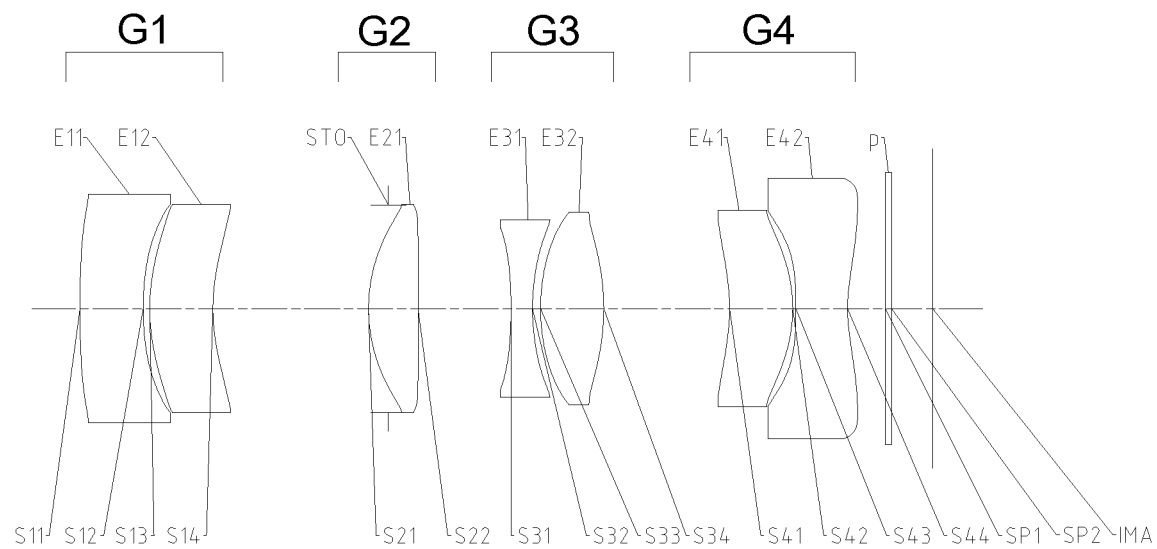
FIG. 7 shows a schematic structural diagram of an optical imaging lens group according to Embodiment 2 of the present application when it is in a wide-angle state.
Figure 8:
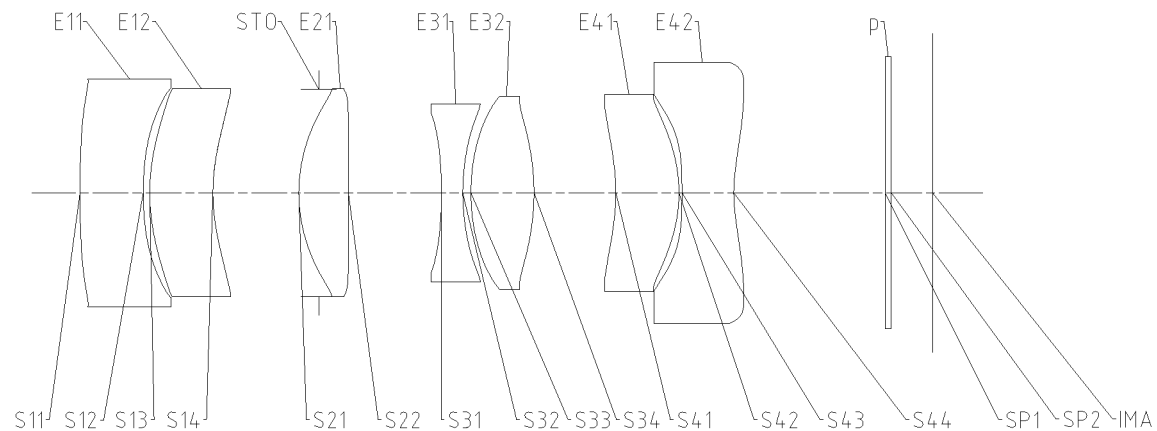
FIG. 8 shows a schematic structural diagram of the optical imaging lens group according to Embodiment 2 of the present application when it is in an intermediate state in a process of switching from the wide-angle state to a telephoto state.

A schematic structural diagram of an optical imaging lens group according to Embodiment 2 of the present application will be described below with reference to FIGS. 7 to 12D, wherein FIG. 7 shows a schematic structural diagram of the optical imaging lens group according to Embodiment 2 of the present application when it is in the wide-angle state; FIG. 8 shows a schematic structural diagram of the optical imaging lens group according to Embodiment 2 of the present application when it is in an intermediate state in the process of switching from the wide-angle state to the telephoto state; and FIG. 9 shows a schematic structural diagram of the optical imaging lens group according to Embodiment 2 of the present application when it is in the telephoto state.

Figure 9:
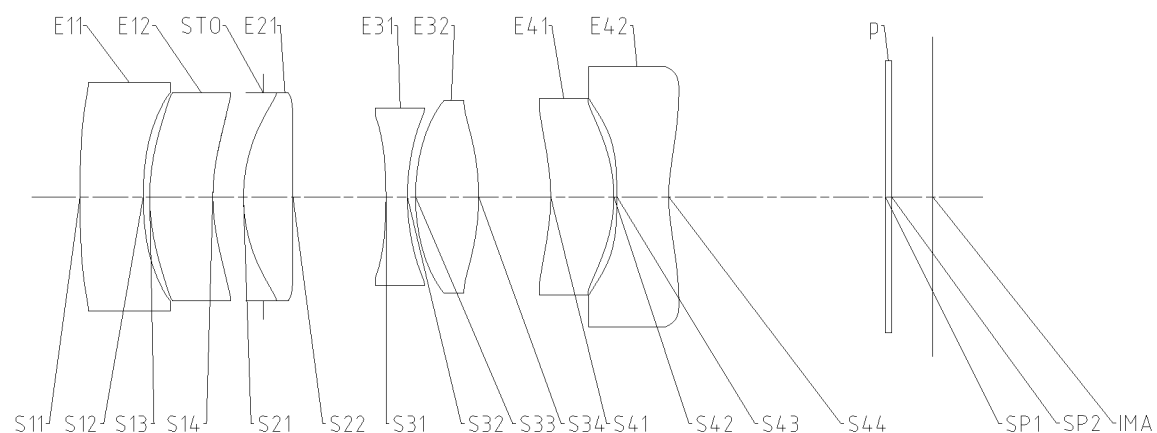
FIG. 9 shows a schematic structural diagram of the optical imaging lens group according to Embodiment 2 of the present application when it is in the telephoto state.

As shown in FIGS. 7 to 9, the optical imaging lens group includes a first lens group G1, a diaphragm STO, a second lens group G2, a third lens group G3, a fourth lens group G4, a filter P and an imaging plane IMA in order from an object side to an image side.

Among them, the first lens group G1 includes a first lens E11 and a second lens E12, the first lens E11 has a negative refractive power, a convex object side surface S11 and a concave image side surface S12, and the second lens E12 has a positive refractive power, a convex object side surface S13 and a concave image side surface S14; the second lens group G2 includes a first lens E21, and the first lens E21 has a positive refractive power, a convex object side surface S21 and a convex image side surface S22; the third lens group G3 includes a first lens E31 and a second lens E32, the first lens E31 has a negative refractive power, a convex object side surface S31 and a concave image side surface S32, and the second lens E32 has a positive refractive power, a convex object side surface S33 and a convex image side surface S34; the fourth lens group G4 includes a first lens E41 and a second lens E42, the first lens E41 has a positive refractive power, a concave object side surface S41 and a convex image side surface S42, and the second lens E42 has a negative refractive power, a concave object side surface S43 and a concave image side surface S44. Light from an object sequentially passes through the respective surfaces S11 to SP2 and finally forms an image on the imaging plane IMA.

Basic parameters of the optical imaging lens group of Embodiment 2 are as shown in Table 4, wherein the radius of curvature, thickness, and focal length are all in unit of millimetres.

TABLE 4

| Surface No. | Surface type | Radius of curvature | Thickness | Focal length | Refractive index | Abbe number | Conic coefficient |
|---|---|---|---|---|---|---|---|
| OBJ | Spherical | Infinity | Infinity | | | | |
| S11 | Aspherical | 78.9982 | 2.1500 | −26.59 | 1.55 | 56.1 | 98.4032 |
| S12 | Aspherical | 12.1522 | 0.1037 | | | | 8.6978 |
| S13 | Aspherical | 7.2509 | 2.1478 | 422.88 | 1.68 | 19.2 | −2.7453 |
| S14 | Aspherical | 6.5481 | T1 | | | | −6.8098 |
| ST0 | Spherical | Infinity | −0.6793 | | | | |
| S21 | Aspherical | 5.5114 | 1.6874 | 10.17 | 1.55 | 56.1 | −1.0650 |
| S22 | Aspherical | 600.0000 | 3.1672 | | | | 99.0000 |
| S31 | Aspherical | −20.6327 | 0.7246 | −7.99 | 1.67 | 20.4 | 30.7808 |
| S32 | Aspherical | 7.2932 | 0.2785 | | | | 3.1627 |
| S33 | Aspherical | 7.1854 | 2.1500 | 7.00 | 1.57 | 37.3 | 1.6338 |
| S34 | Aspherical | −8.0357 | T2 | | | | 4.8228 |
| S41 | Aspherical | −7.2952 | 2.1500 | 18.24 | 1.68 | 19.2 | −11.5904 |
| S42 | Aspherical | −5.1367 | 0.0600 | | | | −1.3754 |
| S43 | Aspherical | −31.5606 | 1.8030 | −8.66 | 1.54 | 55.7 | 37.5961 |
| S44 | Aspherical | 5.5651 | T3 | | | | −10.0349 |
| SP1 | Spherical | Infinity | 0.2100 | | 1.52 | 64.2 | |
| SP2 | Spherical | Infinity | 1.4029 | | | | |
| IMA | Spherical | Infinity | | | | | |

Corresponding values of T1, T2 and T3 in the wide-angle state (W), intermediate state (M) and telephoto state (T) of the optical imaging lens group of Embodiment 2 during the zoom process are given in Table 2 below in unit of millimetres.

TABLE 5

|    | W      | M      | T      |
|----|--------|--------|--------|
| T1 | 6.0896 | 3.6035 | 1.7178 |
| T2 | 4.2803 | 2.7833 | 2.4491 |
| T3 | 1.2842 | 5.2664 | 7.4874 |

Higher-order coefficients A4, A6, A8, A10, A12, A14, A16, A18 and A20 of aspherical lens surfaces S11 to S44 of aspherical lenses that can be used in Embodiment 2 of the present application are given in Table 6 below.

TABLE 6

| Surface No. | A4 | A6 | A8 | A10 | A12 | A14 | A16 | A18 | A20 |
|---|---|---|---|---|---|---|---|---|---|
| S11 | 1.7768E−03 | −8.4560E−05 | −6.5041E−06 | 4.0676E−06 | −8.8517E−07 | 1.1378E−07 | −8.9341E−09 | 3.9669E−10 | −7.6533E−12 |
| S12 | 5.3738E−03 | −1.3815E−03 | 2.8837E−04 | −3.8282E−05 | 2.5638E−06 | 3.6422E−08 | −2.1200E−08 | 1.4527E−09 | −3.2410E−11 |
| S13 | 2.0743E−03 | −1.0445E−03 | 2.4635E−04 | −3.7553E−05 | 3.7236E−06 | −2.1913E−07 | 5.6860E−09 | 0.0000E+00 | 0.0000E+00 |
| S14 | 7.3176E−05 | −1.4003E−04 | 1.5286E−05 | −9.0505E−07 | −2.9982E−08 | 6.1698E−09 | −1.7772E−10 | 0.0000E+00 | 0.0000E+00 |
| S21 | 5.6040E−04 | 2.2689E−05 | −9.5097E−06 | 2.9502E−06 | −4.6562E−07 | 3.7684E−08 | −1.3651E−09 | 0.0000E+00 | 0.0000E+00 |
| S22 | −1.5889E−04 | 8.3660E−06 | −7.1740E−06 | 2.7973E−06 | −4.8574E−07 | 3.9446E−08 | −1.4634E−09 | 0.0000E+00 | 0.0000E+00 |
| S31 | −4.6375E−03 | 3.1627E−05 | 2.0100E−04 | −3.6437E−05 | 1.1879E−06 | 2.5183E−07 | −2.1047E−08 | 0.0000E+00 | 0.0000E+00 |
| S32 | −2.1393E−03 | −1.3624E−03 | 6.7812E−04 | −1.2734E−04 | 1.1496E−05 | −4.5626E−07 | 2.5252E−09 | 0.0000E+00 | 0.0000E+00 |
| S33 | 2.2861E−03 | −1.5252E−03 | 4.8486E−04 | −8.0607E−05 | 7.3734E−06 | −3.4338E−07 | 6.2615E−09 | 0.0000E+00 | 0.0000E+00 |
| S34 | 1.8873E−03 | −1.1846E−05 | 2.3046E−05 | −3.5162E−06 | 7.0738E−07 | −6.9387E−08 | 3.7861E−09 | 0.0000E+00 | 0.0000E+00 |
| S41 | 6.5977E−04 | −1.6848E−04 | 4.5794E−05 | −2.8898E−06 | −3.0178E−07 | 5.6283E−08 | −2.2700E−09 | 0.0000E+00 | 0.0000E+00 |
| S42 | 1.0171E−04 | −2.6243E−04 | 7.9393E−05 | −4.2773E−06 | −5.9079E−07 | 6.9327E−08 | −1.3668E−09 | 0.0000E+00 | 0.0000E+00 |
| S43 | −1.2680E−02 | 6.1124E−04 | 1.6591E−05 | 8.9128E−06 | −3.1621E−06 | 2.9778E−07 | −8.8657E−09 | 0.0000E+00 | 0.0000E+00 |
| S44 | −5.7956E−03 | 5.4100E−04 | −3.2838E−05 | 1.6325E−06 | −1.2448E−07 | 8.5014E−09 | −2.3854E−10 | 0.0000E+00 | 0.0000E+00 |

Figure 10A:
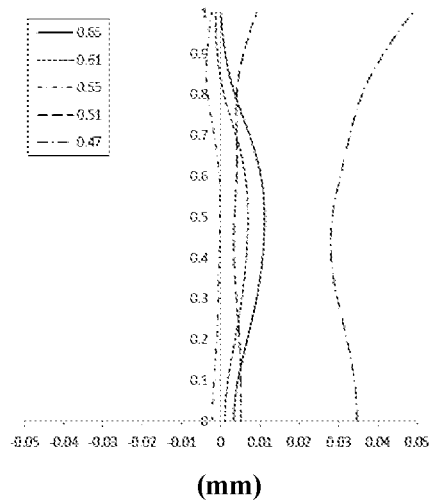
FIGS. 10A to 10D show a longitudinal aberration curve, astigmatism curve, distortion curve and lateral color curve of the optical imaging lens group of Embodiment 2 when it is in the wide-angle state, respectively.
Figure 10B:
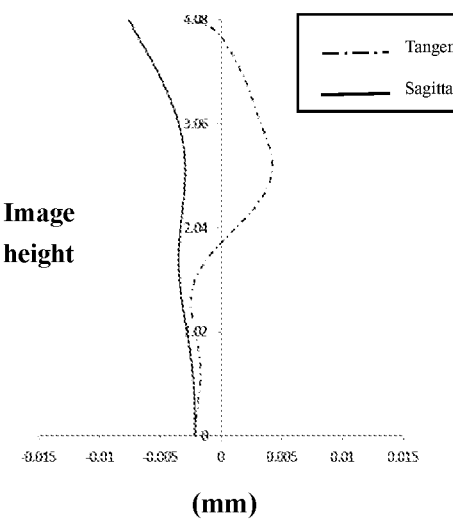
Figure 10C:
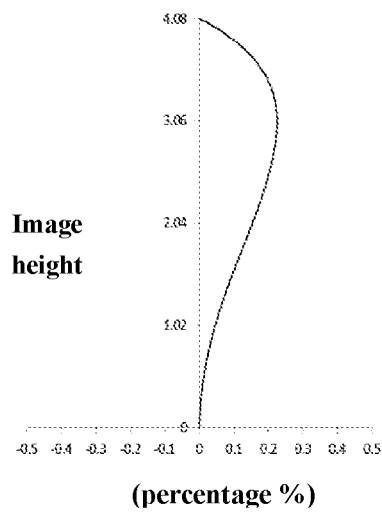
Figure 10D:
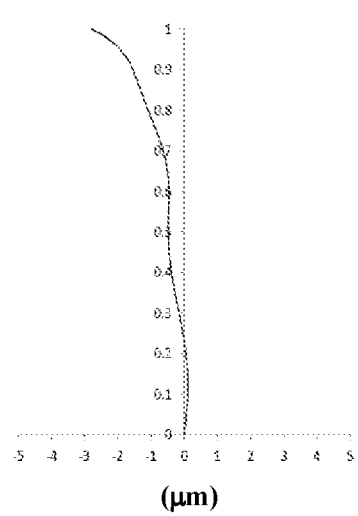
Figure 11A:
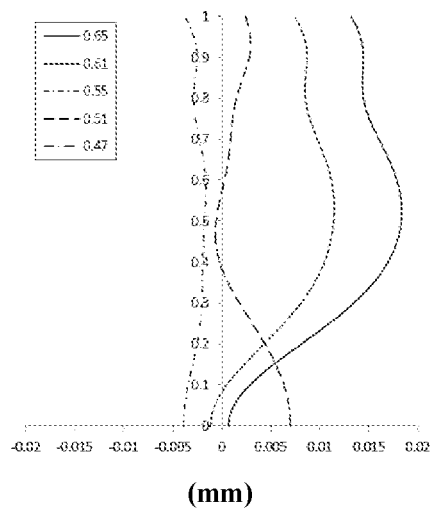
FIGS. 11A to 11D show a longitudinal aberration curve, astigmatism curve, distortion curve and lateral color curve of the optical imaging lens group of Embodiment 2 when it is in the intermediate state in the process of switching from the wide-angle state to the telephoto state, respectively.
Figure 11B:
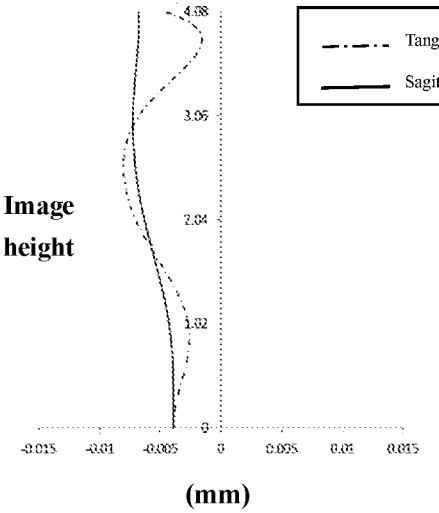
Figure 11C:
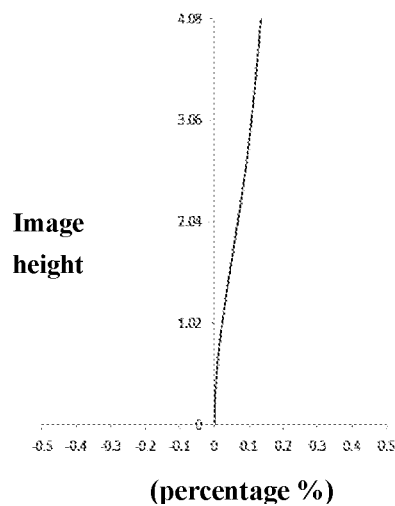
Figure 11D:
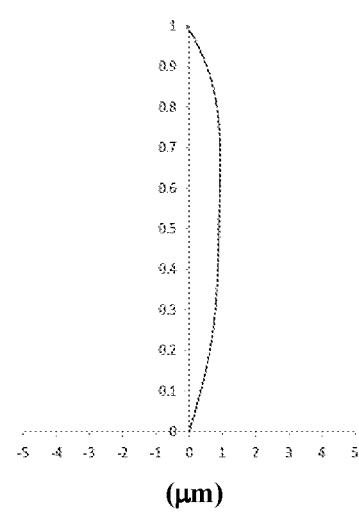
Figure 12A:
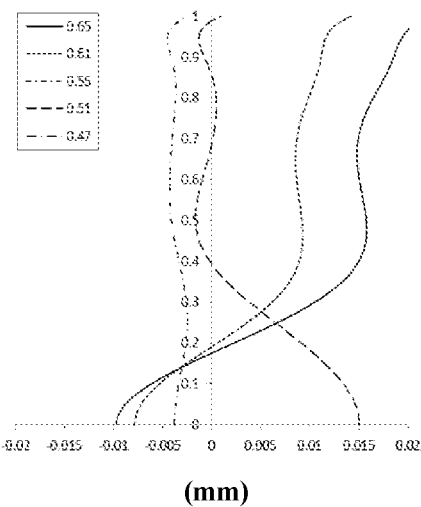
FIGS. 12A to 12D show a longitudinal aberration curve, astigmatism curve, distortion curve and lateral color curve of the optical imaging lens group of Embodiment 2 when it is in the telephoto state, respectively.
Figure 12B:
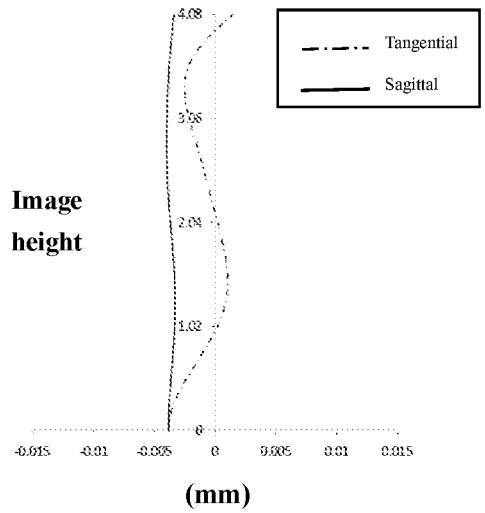
Figure 12C:
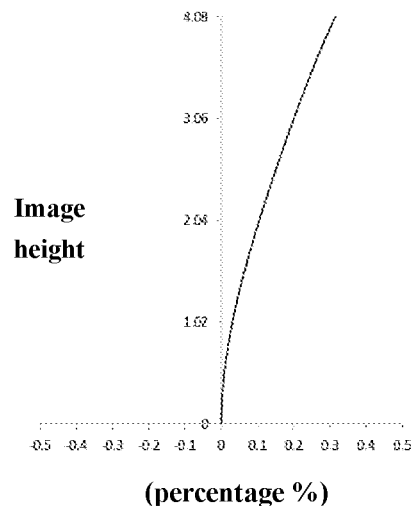
Figure 12D:
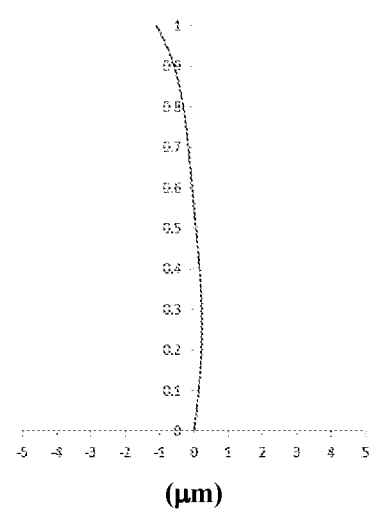

FIGS. 10A, 11A and 12A show longitudinal aberration curves of the optical imaging lens group of Embodiment 2 when it is in the wide-angle state, the intermediate state, and the telephoto state, respectively, which represent the deviation of the converged focal point after light of different wavelengths passes through the camera lens. FIGS. 10B, 11B and 12B show astigmatism curves of the optical imaging lens group of Embodiment 2 when it is in the wide-angle state, the intermediate state, and the telephoto state, respectively, which represent the curvature of the tangential image plane and the curvature of the sagittal image plane. FIGS. 10C, 11C and 12C show distortion curves of the optical imaging lens group of Embodiment 2 when it is in the wide-angle state, the intermediate state and the telephoto state, respectively, which represent distortion magnitude values corresponding to different image heights. FIGS. 10D, 11D and 12D show lateral color curves of the optical imaging lens group of Embodiment 2 when it is in the wide-angle state, the intermediate state, and the telephoto state, respectively, which represent the deviation of different image heights on the imaging plane after light passes through the camera lens. According to FIGS. 10A to 12D, it can be seen that the optical imaging lens group given in Embodiment 2 can achieve good imaging quality in all states.

Embodiment 3

Figure 13:
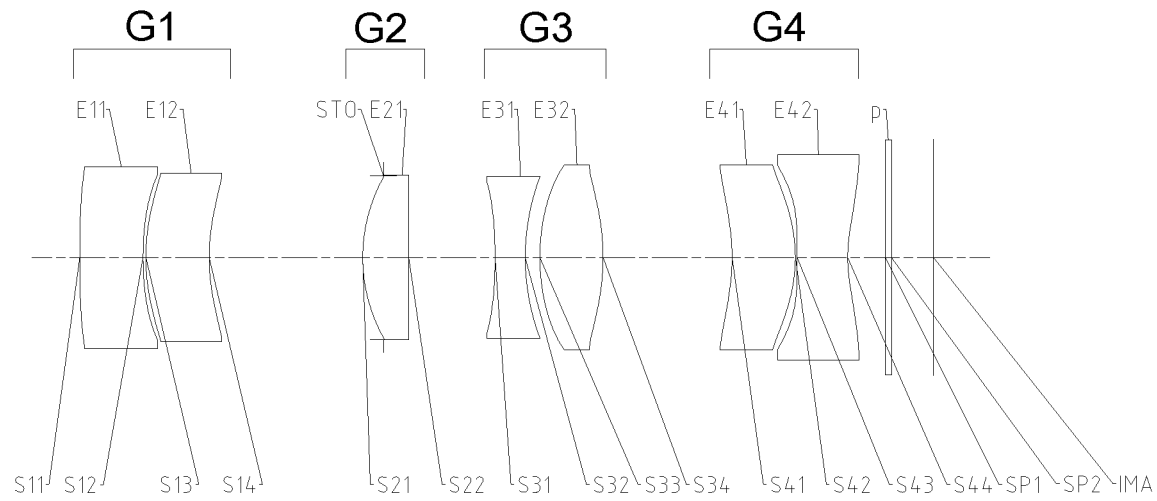
FIG. 13 shows a schematic structural diagram of an optical imaging lens group according to Embodiment 3 of the present application when it is in a wide-angle state.
Figure 14:
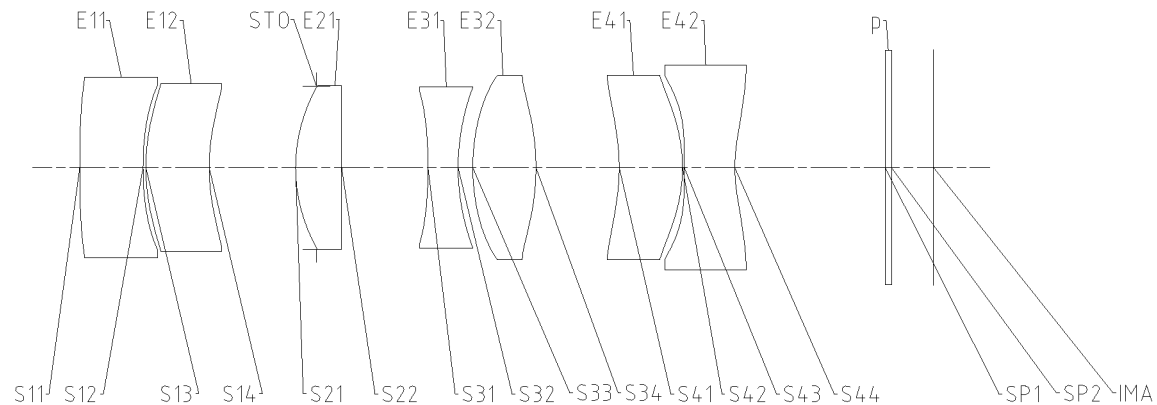
FIG. 14 shows a schematic structural diagram of the optical imaging lens group according to Embodiment 3 of the present application when it is in an intermediate state in a process of switching from the wide-angle state to a telephoto state.

A schematic structural diagram of an optical imaging lens group according to Embodiment 3 of the present application will be described below with reference to FIGS. 13 to 18D, wherein FIG. 13 shows a schematic structural diagram of the optical imaging lens group according to Embodiment 3 of the present application when it is in the wide-angle state; FIG. 14 shows a schematic structural diagram of the optical imaging lens group according to Embodiment 3 of the present application when it is in an intermediate state in the process of switching from the wide-angle state to the telephoto state; and FIG. 15 shows a schematic structural diagram of the optical imaging lens group according to Embodiment 3 of the present application when it is in the telephoto state.

Figure 15:
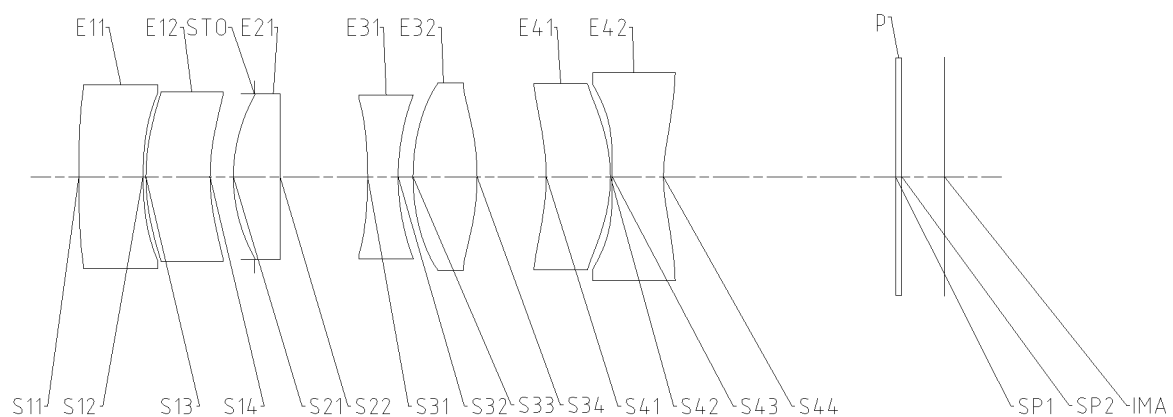
FIG. 15 shows a schematic structural diagram of the optical imaging lens group according to Embodiment 3 of the present application when it is in the telephoto state.

As shown in FIGS. 13 to 15, the optical imaging lens group includes a first lens group G1, a diaphragm STO, a second lens group G2, a third lens group G3, a fourth lens group G4, a filter P and an imaging plane IMA in order from an object side to an image side.

Among them, the first lens group G1 includes a first lens E11 and a second lens E12, the first lens E11 has a negative refractive power, a convex object side surface S11 and a concave image side surface S12, and the second lens E12 has a positive refractive power, a convex object side surface S13 and a concave image side surface S14; the second lens group G2 includes a first lens E21, and the first lens E21 has a positive refractive power, a convex object side surface S21 and a concave image side surface S22; the third lens group G3 includes a first lens E31 and a second lens E32, the first lens E31 has a negative refractive power, a concave object side surface S31 and a concave image side surface S32, and the second lens E32 has a positive refractive power, a convex object side surface S33 and a convex image side surface S34; the fourth lens group G4 includes a first lens E41 and a second lens E42, the first lens E41 has a positive refractive power, a concave object side surface S41 and a convex image side surface S42, and the second lens E42 has a negative refractive power, a convex object side surface S43 and a concave image side surface S44. Light from an object sequentially passes through the respective surfaces S11 to SP2 and finally forms an image on the imaging plane IMA.

Basic parameters of the optical imaging lens group of Embodiment 3 are as shown in Table 7, wherein the radius of curvature, thickness, and focal length are all in unit of millimetres.

TABLE 7

| Surface No. | Surface type | Radius of curvature | Thickness | Focal length | Refractive index | Abbe number | Conic coefficient |
|---|---|---|---|---|---|---|---|
| OBJ | Spherical | Infinity | Infinity | | | | |
| S11 | Aspherical | 84.6592 | 2.1500 | −26.40 | 1.55 | 56.1 | 78.7562 |
| S12 | Aspherical | 12.2102 | 0.0957 | | | | 8.5661 |
| S13 | Aspherical | 7.2972 | 2.1500 | 210.10 | 1.68 | 19.2 | −2.9515 |
| S14 | Aspherical | 6.7748 | T1 | | | | −6.8918 |
| ST0 | Spherical | Infinity | −0.7088 | | | | |
| S21 | Aspherical | 5.5527 | 1.5656 | 10.27 | 1.55 | 56.1 | −1.0509 |
| S22 | Aspherical | 485.8064 | 2.9356 | | | | 99.0000 |
| S31 | Aspherical | −21.2247 | 1.0221 | −8.00 | 1.67 | 20.4 | 26.9706 |
| S32 | Aspherical | 7.2662 | 0.4988 | | | | 2.9794 |
| S33 | Aspherical | 7.3208 | 2.1500 | 7.05 | 1.57 | 37.3 | 1.5888 |
| S34 | Aspherical | −7.9863 | T2 | | | | 4.6642 |
| S41 | Aspherical | −7.0669 | 2.1500 | 22.31 | 1.68 | 19.2 | −11.8030 |
| S42 | Aspherical | −5.4106 | 0.0600 | | | | −1.6313 |
| S43 | Aspherical | 200.0000 | 1.7145 | −9.49 | 1.54 | 55.7 | −99.0000 |
| S44 | Aspherical | 4.9532 | T3 | | | | −7.2696 |
| SP1 | Spherical | Infinity | 0.2100 | | 1.52 | 64.2 | |
| SP2 | Spherical | Infinity | 1.4307 | | | | |
| IMA | Spherical | Infinity | | | | | |

Corresponding values of T1, T2 and T3 in the wide-angle state (W), intermediate state (M) and telephoto state (T) of the optical imaging lens group of Embodiment 3 during the zoom process are given in Table 8 below in unit of millimetres.

TABLE 8

| | W | M | T |
|---|---|---|---|
| T1 | 5.9255 | 3.6458 | 1.4913 |
| T2 | 4.3852 | 2.8287 | 2.3169 |
| T3 | 1.2785 | 5.1137 | 7.7809 |

Higher-order coefficients A4, A6, A8, A10, A12, A14, A16, A18 and A20 of aspherical lens surfaces S11 to S44 of aspherical lenses that can be used in Embodiment 3 of the present application are given in Table 9 below.

Figure 16A:
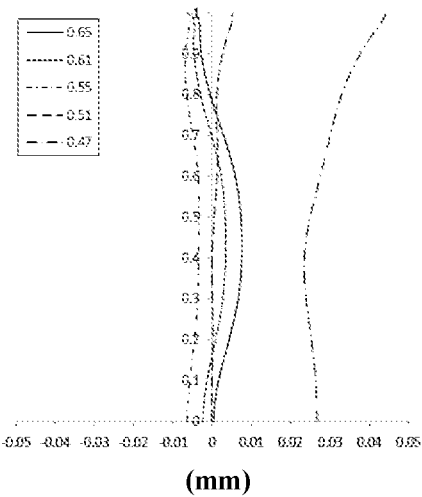
FIGS. 16A to 16D show a longitudinal aberration curve, astigmatism curve, distortion curve and lateral color curve of the optical imaging lens group of Embodiment 3 when it is in the wide-angle state, respectively.
Figure 16B:
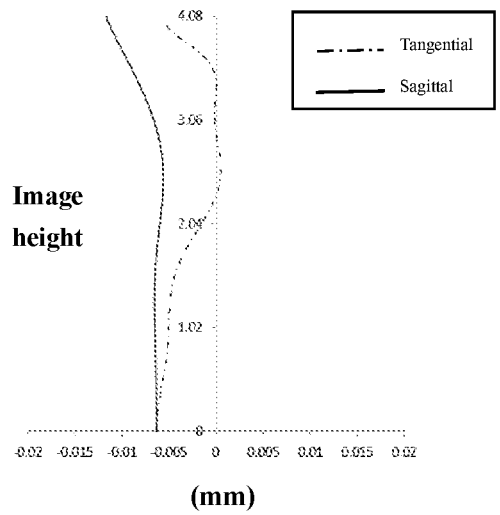
Figure 16C:
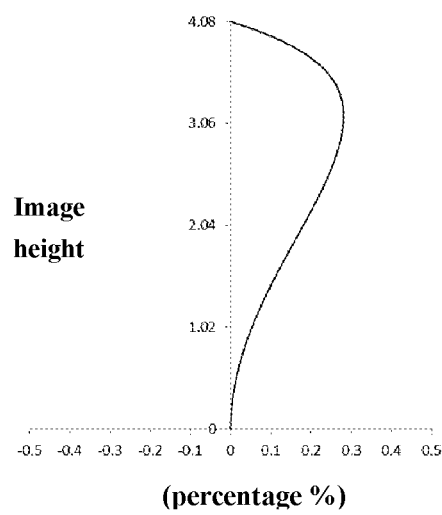
Figure 16D:
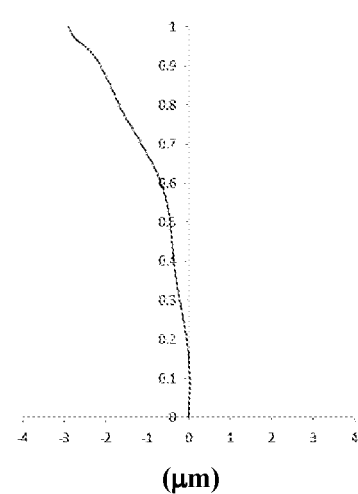
Figure 17A:
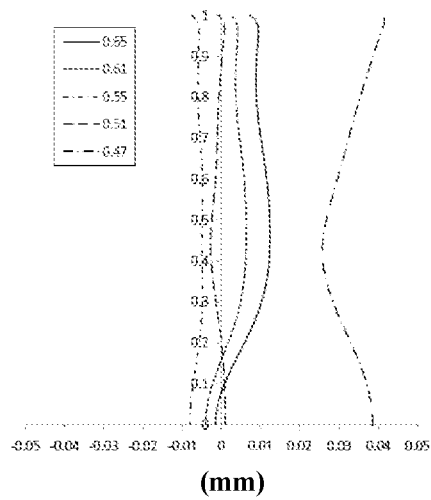
FIGS. 17A to 17D show a longitudinal aberration curve, astigmatism curve, distortion curve and lateral color curve of the optical imaging lens group of Embodiment 3 when it is in the intermediate state in the process of switching from the wide-angle state to the telephoto state, respectively.
Figure 17B:
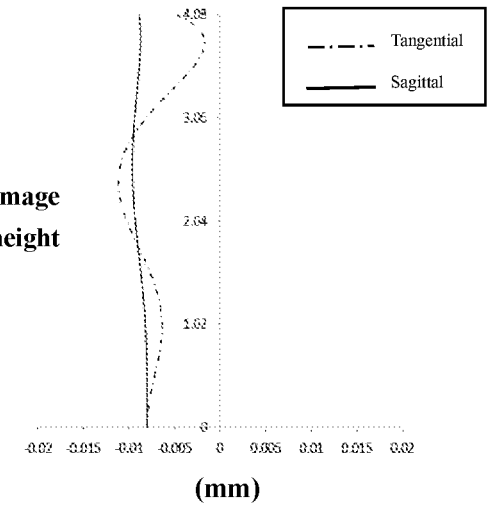
Figure 17C:
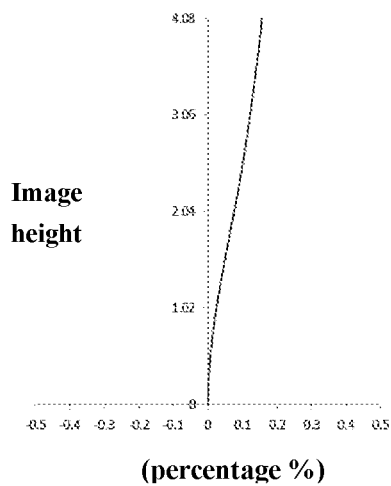
Figure 17D:
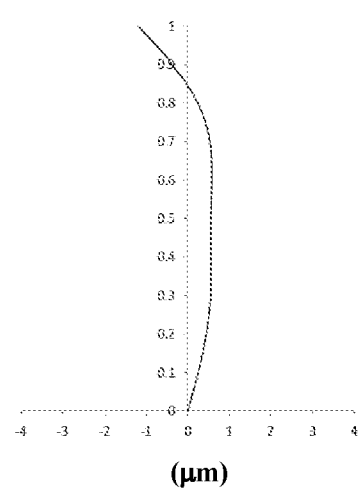
Figure 18A:
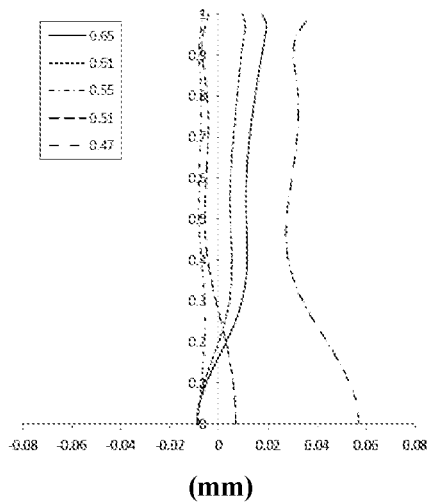
FIGS. 18A to 18D show a longitudinal aberration curve, astigmatism curve, distortion curve and lateral color curve of the optical imaging lens group of Embodiment 3 when it is in the telephoto state, respectively.
Figure 18B:
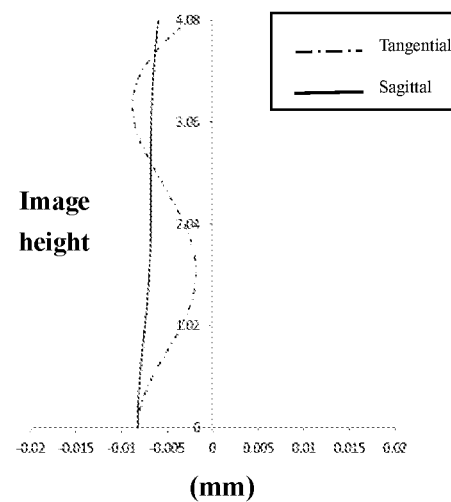
Figure 18C:
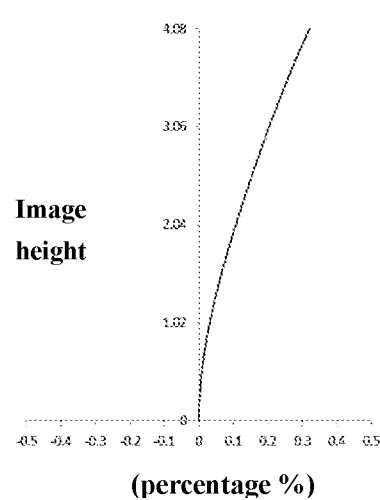
Figure 18D:
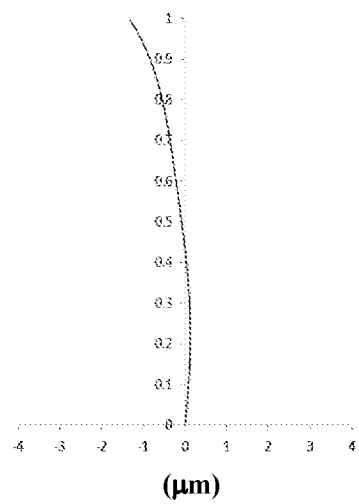

FIGS. 16A, 17A and 18A show longitudinal aberration curves of the optical imaging lens group of Embodiment 3 when it is in the wide-angle state, the intermediate state, and the telephoto state, respectively, which represent the deviation of the converged focal point after light of different wavelengths passes through the camera lens. FIGS. 16B, 17B and 18B show astigmatism curves of the optical imaging lens group of Embodiment 3 when it is in the wide-angle state, the intermediate state, and the telephoto state, respectively, which represent the curvature of the tangential image plane and the curvature of the sagittal image plane. FIGS. 16C, 17C and 18C show distortion curves of the optical imaging lens group of Embodiment 3 when it is in the wide-angle state, the intermediate state and the telephoto state, respectively, which represent distortion magnitude values corresponding to different image heights. FIGS. 16D, 17D and 18D show lateral color curves of the optical

TABLE 9

| Surface No. | A4 | A6 | A8 | A10 | A12 | A14 | A16 | A18 | A20 |
|---|---|---|---|---|---|---|---|---|---|
| S11 | 1.7519E−03 | −8.4968E−05 | −2.7053E−06 | 2.8900E−06 | −6.8242E−07 | 8.9990E−08 | −6.9924E−09 | 2.9902E−10 | −5.4525E−12 |
| S12 | 4.6979E−03 | −1.2726E−03 | 3.2030E−04 | −5.3234E−05 | 5.0150E−06 | −1.8541E−07 | −6.6483E−09 | 6.7721E−10 | −1.1634E−11 |
| S13 | 1.7012E−03 | −9.6367E−04 | 2.6962E−04 | −4.8079E−05 | 5.2299E−06 | −3.1034E−07 | 7.4897E−09 | 0.0000E+00 | 0.0000E+00 |
| S14 | −3.0592E−06 | −1.3223E−04 | 2.3527E−05 | −4.2572E−06 | 5.4248E−07 | −4.0389E−08 | 1.2857E−09 | 0.0000E+00 | 0.0000E+00 |
| S21 | 5.3271E−04 | 3.4064E−05 | −1.3962E−05 | 4.4389E−06 | −6.7983E−07 | 5.3349E−08 | −1.8027E−09 | 0.0000E+00 | 0.0000E+00 |
| S22 | −2.3865E−04 | 2.6723E−05 | −1.4656E−05 | 5.7274E−06 | −9.8655E−07 | 8.1864E−08 | −2.8631E−09 | 0.0000E+00 | 0.0000E+00 |
| S31 | −3.6251E−03 | 3.3893E−05 | 6.7904E−05 | 5.0169E−06 | −5.0307E−06 | 7.3083E−07 | −3.5311E−08 | 0.0000E+00 | 0.0000E+00 |
| S32 | −2.3074E−03 | −5.4711E−04 | 2.2523E−04 | −1.7648E−05 | −3.3846E−06 | 6.4089E−07 | −3.0850E−08 | 0.0000E+00 | 0.0000E+00 |
| S33 | 9.7171E−04 | −5.7686E−04 | 1.3880E−04 | −1.1778E−05 | −3.1137E−07 | 1.0857E−07 | −4.5245E−09 | 0.0000E+00 | 0.0000E+00 |
| S34 | 2.0296E−03 | −1.0695E−06 | 3.0586E−05 | −6.0590E−06 | 1.3086E−06 | −1.3730E−07 | 6.3662E−09 | 0.0000E+00 | 0.0000E+00 |
| S41 | 7.4453E−04 | −1.9013E−04 | 4.7527E−05 | −3.2779E−06 | −1.9849E−07 | 4.2908E−08 | −1.7166E−09 | 0.0000E+00 | 0.0000E+00 |
| S42 | −2.3086E−05 | −9.2457E−05 | 5.1578E−05 | −5.4884E−06 | 2.4650E−07 | −1.2550E−08 | 1.0484E−09 | 0.0000E+00 | 0.0000E+00 |
| S43 | −1.4133E−02 | 8.5908E−04 | 2.1601E−05 | −5.5745E−06 | −6.1231E−08 | 3.1774E−08 | −6.2981E−10 | 0.0000E+00 | 0.0000E+00 |
| S44 | −7.6202E−03 | 8.8118E−04 | −7.6669E−05 | 5.2386E−06 | −2.7331E−07 | 9.2742E−09 | −1.4792E−10 | 0.0000E+00 | 0.0000E+00 | imaging lens group of Embodiment 3 when it is in the wide-angle state, the intermediate state, and the telephoto state, respectively, which represent the deviation of different image heights on the imaging plane after light passes through the camera lens. According to FIGS. 16A to 18D, it can be seen that the optical imaging lens group given in Embodiment 3 can achieve good imaging quality in all states.

In summary, the basic data of Embodiments 1-3 of the present application in the wide-angle state, the intermediate state, and the telephoto state are as shown in Table 10 below:

TABLE 10

|  | Embodiment 1 | | | Embodiment 2 | | | Embodiment 3 | | |
| --- | --- | --- | --- | --- | --- | --- | --- | --- | --- |
|  | W | M | T | W | M | T | W | M | T |
| FOV (°) | 32.5 | 24.1 | 19.8 | 32.6 | 24.1 | 19.8 | 32.7 | 24.7 | 19.9 |
| Fno | 2.94 | 3.66 | 4.14 | 3.00 | 3.76 | 4.25 | 2.88 | 3.56 | 4.09 |
| f (mm) | 14.00 | 19.12 | 23.32 | 13.95 | 19.10 | 23.25 | 13.92 | 18.61 | 23.20 |
| TTL (mm) | | 29.01 | | | 29.01 | | | 29.01 | |
| ImgH (mm) | | 4.08 | | | 4.08 | | | 4.08 | |
| f1 (mm) | | −26.95 | | | −26.59 | | | −26.40 | |
| f2 (mm) | | −9002.52 | | | 422.88 | | | 210.10 | |
| f3 (mm) | | 10.01 | | | 10.17 | | | 10.27 | |
| f4 (mm) | | −8.01 | | | −7.99 | | | −8.00 | |
| f5 (mm) | | 7.01 | | | 7.00 | | | 7.05 | |
| f6 (mm) | | 15.95 | | | 18.24 | | | 22.31 | |
| f7 (mm) | | −8.13 | | | −8.66 | | | −9.49 | |

In Embodiments 1-3 of the present application, the conditional expressions satisfy the conditions in Table 11 below:

TABLE 11

| Conditional expression\Embodiment | Embodiment 1 | Embodiment 2 | Embodiment 3 |
| --- | --- | --- | --- |
| TTL/ft | 1.24 | 1.25 | 1.25 |
| R32/R33 | 1.01 | 1.01 | 0.99 |
| 10 × (R3L − R41)/(R3L + R41) | 0.57 | 0.48 | 0.61 |
| DTmax/Dtmin | 1.36 | 1.70 | 1.35 |
| Σ CT/TTL | 0.45 | 0.44 | 0.44 |
| TG3/TG4 | 0.75 | 0.79 | 0.94 |
| CT11/ET11 | 0.86 | 0.77 | 0.86 |
| SAG42/SAG43 | 1.01 | 0.97 | 1.18 |
| fG1/FG3 | −0.80 | −0.91 | −1.07 |
| fG4/fw | −1.06 | −1.06 | −1.06 |
| R1L/R21 | 1.08 | 1.19 | 1.22 |
| ΔTG12/Δf | −0.46 | −0.47 | −0.48 |
| ΔTG34/Δf | −0.17 | −0.20 | −0.22 |

The above description is only the preferred embodiments of the present application and the explanation of the applied technical principle. It should be understood by those skilled in the art that the scope of invention involved in the present application is not limited to technical solutions formed by specific combinations of the above technical features, and at the same time, should also cover other technical solutions formed by any combination of the above technical features or equivalent features thereof without departing from the concept of the invention. For example, the above features and (but not limited to) the technical features with similar functions disclosed in the present application are replaced with each other to form technical solutions.

What is claimed is:

1. An optical imaging lens group, comprising, in order from an object side to an image side along an optical axis: a first lens group having a refractive power, in which an image side surface of a lens closest to an imaging side is concave;
a second lens group having a refractive power;
a third lens group having a refractive power; and
a fourth lens group having a negative refractive power, in which an image side surface of a lens closest to the imaging side is concave and includes at least one inflection point,
wherein the first lens group is a fixed group, and the second lens group, the third lens group and the fourth lens group move on the optical axis to realize continuous zoom of the optical imaging lens group from a wide-angle end to a telephoto end; and the second lens group and the third lens group have an unchanged relative position and move on the optical axis simultaneously,
wherein an on-axis distance TG3 from an object side surface of a first lens of the third lens group to an image side surface of the last lens of the third lens group and an on-axis distance TG4 from an object side surface of a first lens of the fourth lens group to an image side surface of the last lens of the fourth lens group satisfy: $0.5 < TG3/TG4 \leq 1$.

2. The optical imaging lens group according to claim 1, wherein an on-axis distance TTL from an object side surface of a first lens to an imaging plane of the optical imaging lens group, and an effective focal length ft of the optical imaging lens group at the telephoto end satisfy: $0.8 < TTL/ft < 1.5$.

3. The optical imaging lens group according to claim 1, wherein an effective focal length fG1 of the first lens group and an effective focal length fG3 of the third lens group satisfy: $-1.2 < fG1/fG3 < -0.7$.

4. The optical imaging lens group according to claim 1, wherein a radius of curvature R32 of an image side surface of a first lens of the third lens group and a radius of curvature R33 of an object side surface of a second lens of the third lens group satisfy: $0.8 < R32/R33 < 1.2$.

5. The optical imaging lens group according to claim 1, wherein a radius of curvature R3L of an image side surface of a lens of the third lens group closest to the imaging plane and a radius of curvature R41 of an object side surface of a first lens of the fourth lens group satisfy: $0 < 10 \times (R3L - R41)/(R3L + R41) < 1$.

6. The optical imaging lens group according to claim 1, wherein the maximum value DTmax among effective radii of lenses in the optical imaging lens group and the minimum value DTmin among the effective radii of the lenses in the optical imaging lens group satisfy: $1 < DTmax/DTmin < 2$.

7. The optical imaging lens group according to claim 1, wherein a sum ΣCT of center thicknesses of lenses in the optical imaging lens group and an on-axis distance TTL from an object side surface of a first lens to the imaging plane of the optical imaging lens group satisfy: $0.3<\Sigma CT/TTL<0.6$.

8. The optical imaging lens group according to claim 1, wherein a center thickness CT11 of a first lens of the first lens group and an edge thickness ET11 of the first lens of the first lens group satisfy: $0.5<CT11/ET11<1$.

9. The optical imaging lens group according to claim 1, wherein an on-axis distance SAG42 from an intersection point of an image side surface of a first lens of the fourth lens group and the optical axis to a vertex of an effective radius of the image side surface of the first lens of the fourth lens group, and an on-axis distance SAG43 from an intersection point of an object side surface of a second lens of the fourth lens group and the optical axis to a vertex of an effective radius of the object side surface of the second lens of the fourth lens group satisfy: $0.8<SAG42/SAG43<1.3$.

10. The optical imaging lens group according to claim 1, wherein an effective focal length fG4 of the fourth lens group and an effective focal length fw of the optical imaging lens group at the wide-angle end satisfy: $-1.5<fG4/fw<-0.9$.

11. The optical imaging lens group according to claim 1, wherein a radius of curvature R1L of an image side surface of the last lens in the first lens group and a radius of curvature R21 of an object side surface of a first lens of the second lens group satisfy: $1<R1L/R21<1.5$.

12. The optical imaging lens group according to claim 1, wherein a displacement amount ΔTG12 of an on-axis distance between the first lens group and the second lens group when the optical imaging lens group changes from the wide-angle end to the telephoto end, and a change amount Δf of an effective focal length of the optical imaging lens group when changing from the wide-angle end to the telephoto end satisfy: $-0.6<\Delta TG12/\Delta f<-0.3$.

13. The optical imaging lens group according to claim 1, wherein a displacement amount ΔTG34 of an on-axis distance between the third lens group and the fourth lens group when the optical imaging lens group changes from the wide-angle end to the telephoto end, and a change amount Δf of an effective focal length of the optical imaging lens group when changing from the wide-angle end to the telephoto end satisfy: $-0.4<\Delta TG34/\Delta f<-0.1$.

14. An optical imaging lens group, comprising, in order from an object side to an image side along an optical axis:
a first lens group having a refractive power, in which an image side surface of a lens closest to an imaging side is concave;
a second lens group having a refractive power;
a third lens group having a refractive power; and
a fourth lens group having a negative refractive power, in which an image side surface of a lens closest to the imaging side is concave and includes at least one inflection point,
wherein the first lens group is a fixed group, and the second lens group, the third lens group and the fourth lens group move on the optical axis to realize continuous zoom of the optical imaging lens group from a wide-angle end to a telephoto end; and the second lens group and the third lens group have an unchanged relative position and move on the optical axis simultaneously; and
a radius of curvature R32 of an image side surface of a first lens of the third lens group and a radius of curvature R33 of an object side surface of a second lens of the third lens group satisfy: $0.8<R32/R33<1.2$.

15. The optical imaging lens group according to claim 14, wherein an effective focal length fG1 of the first lens group and an effective focal length fG3 of the third lens group satisfy: $-1.2<fG1/fG3<-0.7$.

16. The optical imaging lens group according to claim 14, wherein a center thickness CT11 of a first lens of the first lens group and an edge thickness ET11 of the first lens of the first lens group satisfy: $0.5<CT11/ET11<1$.

17. The optical imaging lens group according to claim 14, wherein an effective focal length fG4 of the fourth lens group and an effective focal length fw of the optical imaging lens group at the wide-angle end satisfy: $-1.5<fG4/fw<-0.9$.

18. The optical imaging lens group according to claim 14, wherein a radius of curvature R1L of an image side surface of the last lens in the first lens group and a radius of curvature R21 of an object side surface of a first lens of the second lens group satisfy: $1<R1L/R21<1.5$.

* * * * *